March 24, 1970  L. F. MALLOY  3,502,849
DEVICE FOR COUNTING VOTES

Filed April 13, 1965  14 Sheets-Sheet 1

INVENTOR.
LEO F. MALLOY
BY *M. A. Hobbs*
ATTORNEY

March 24, 1970 L. F. MALLOY 3,502,849
DEVICE FOR COUNTING VOTES
Filed April 13, 1965 14 Sheets-Sheet 2

INVENTOR.
LEO F. MALLOY
BY
ATTORNEY

March 24, 1970   L. F. MALLOY   3,502,849

DEVICE FOR COUNTING VOTES

Filed April 13, 1965   14 Sheets-Sheet 3

INVENTOR

LEO F. MALLOY

BY *M A Hobbs*

ATTORNEY

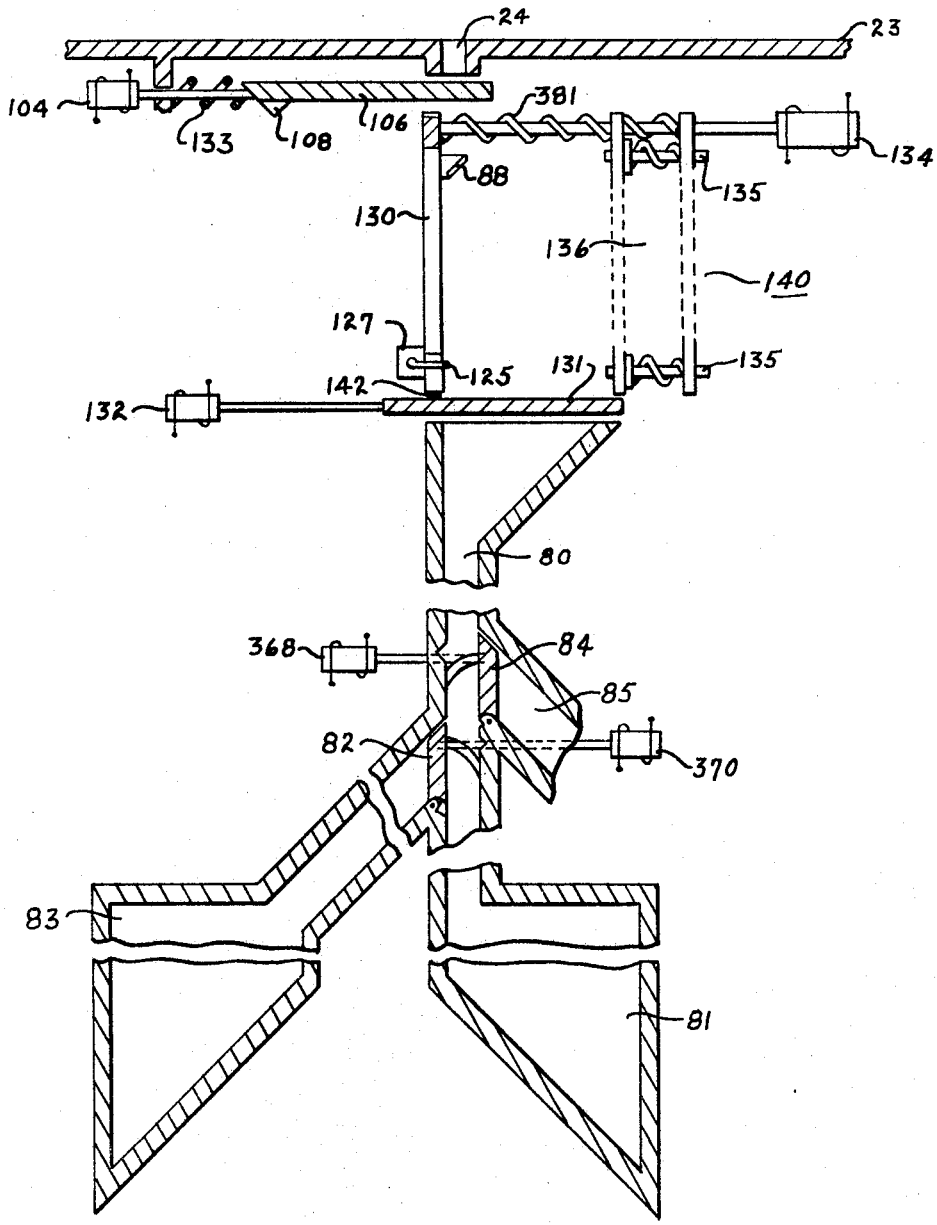

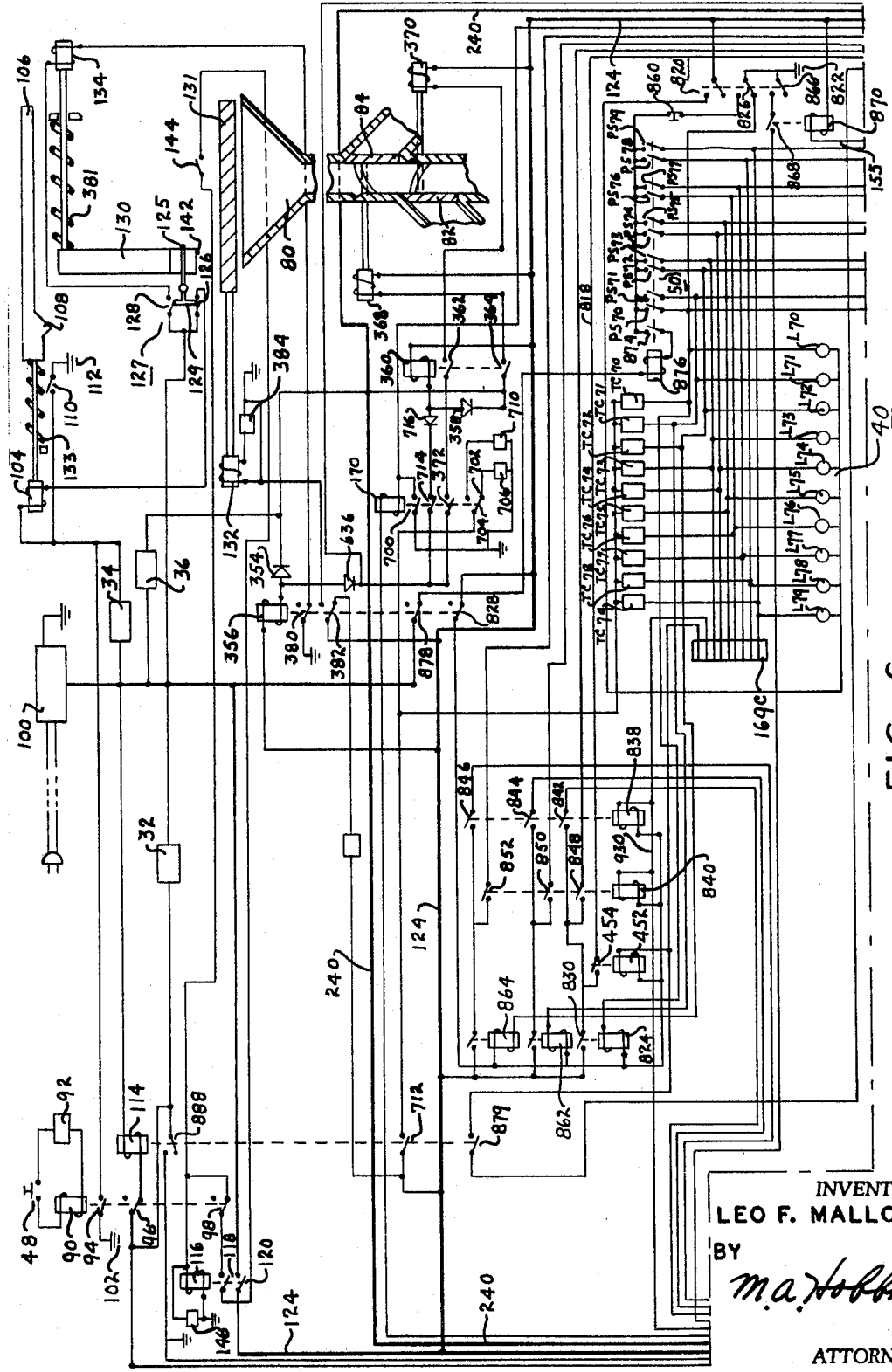

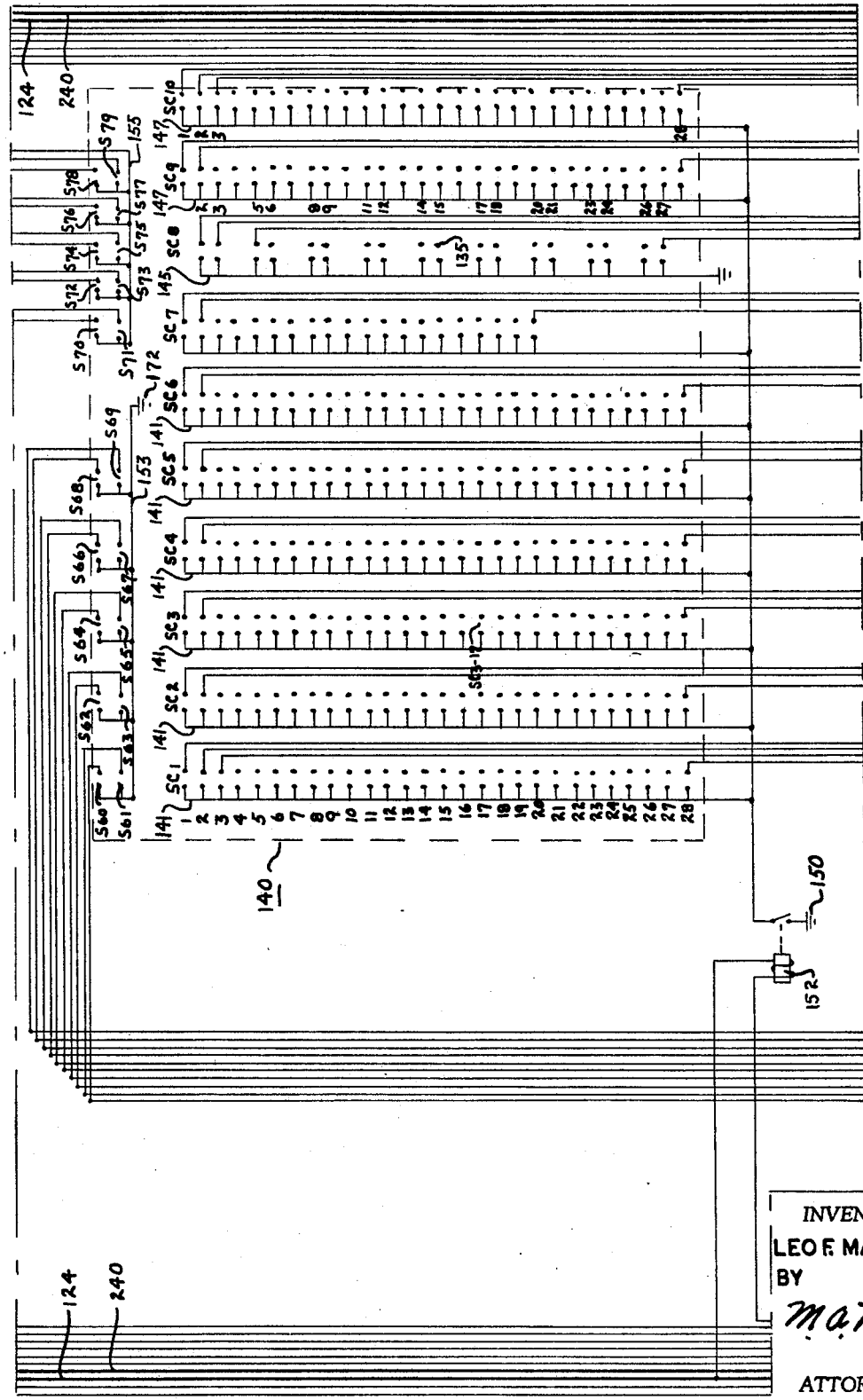

March 24, 1970   L. F. MALLOY   3,502,849
DEVICE FOR COUNTING VOTES
Filed April 13, 1965   14 Sheets-Sheet 8

INVENTOR
LEO F. MALLOY
BY
ATTORNEY

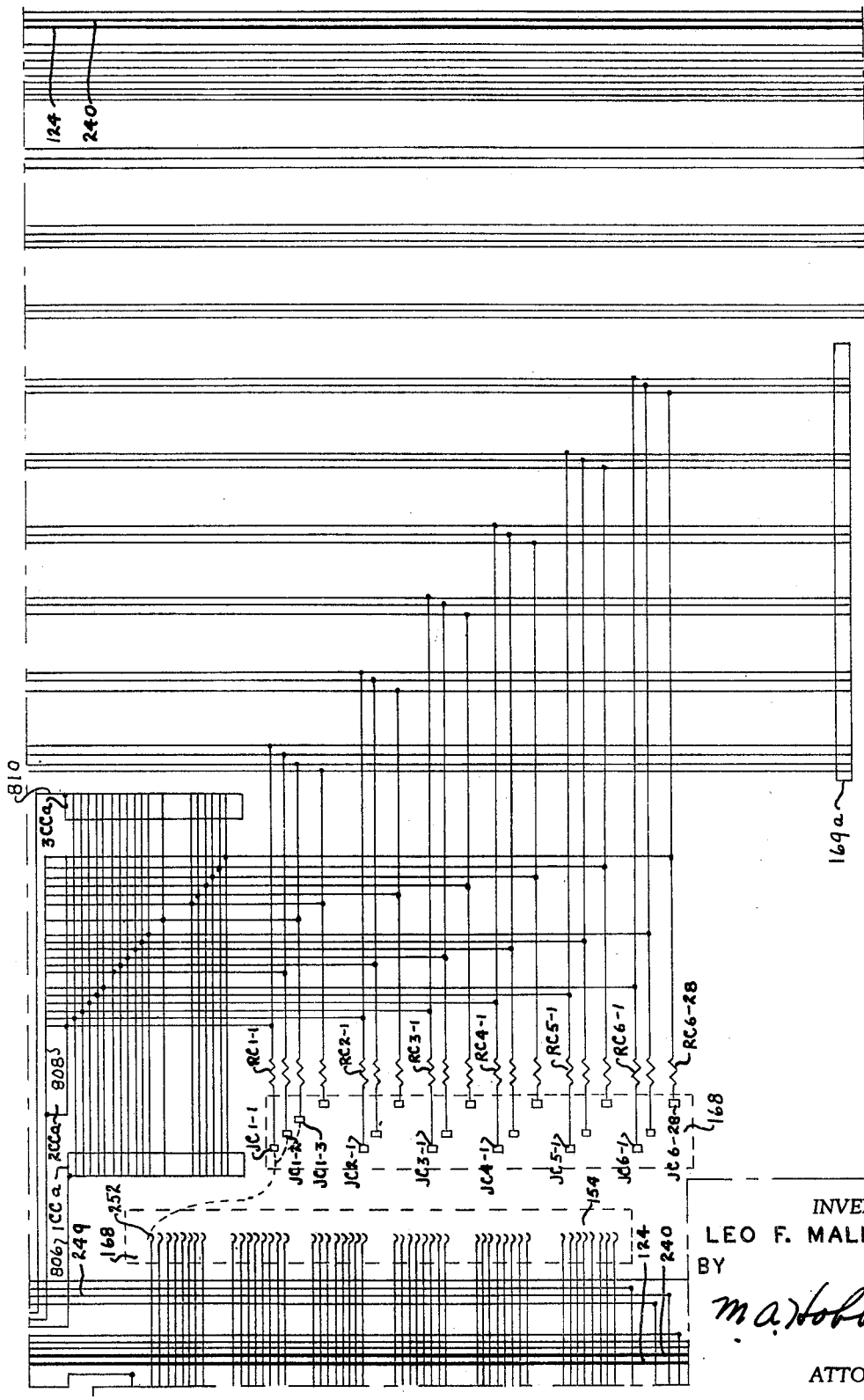

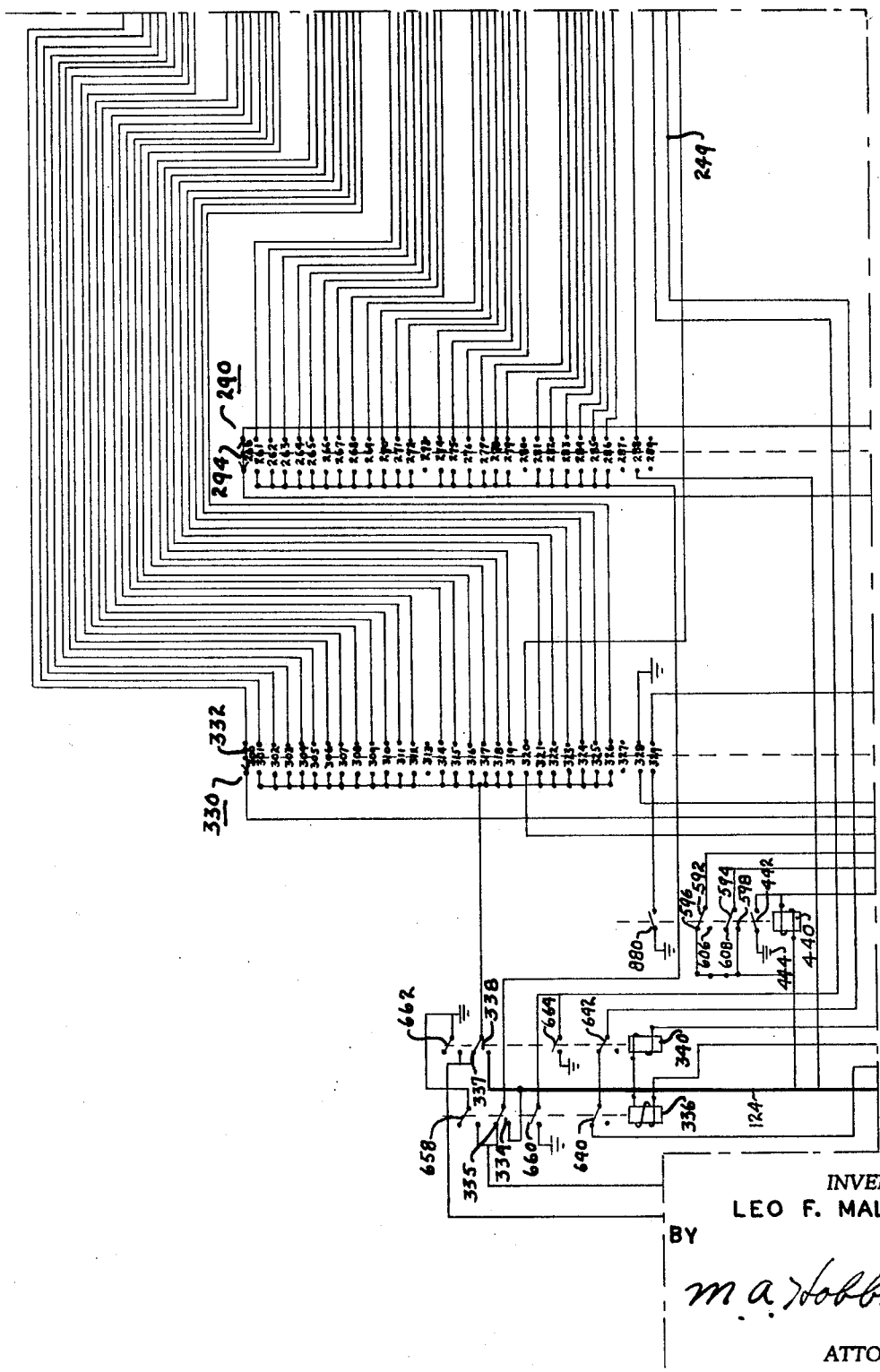

INVENTOR
LEO F. MALLOY
BY
ATTORNEY

March 24, 1970   L. F. MALLOY   3,502,849
DEVICE FOR COUNTING VOTES
Filed April 13, 1965   14 Sheets-Sheet 13

INVENTOR
LEO F. MALLOY
BY
ATTORNEY

March 24, 1970  L. F. MALLOY  3,502,849
DEVICE FOR COUNTING VOTES

Filed April 13, 1965  14 Sheets-Sheet 14

INVENTOR
LEO F. MALLOY

BY  *M. A. Hobbs*

ATTORNEY

United States Patent Office 3,502,849
Patented Mar. 24, 1970

3,502,849
DEVICE FOR COUNTING VOTES
Leo F. Malloy, 1843 Fremont, Chicago, Ill. 60614
Continuation-in-part of application Ser. No. 175,444, Feb. 26, 1962. This application Apr. 13, 1965, Ser. No. 447,648
Int. Cl. G06k *17/00;* G07c *13/00*
U.S. Cl. 235—61.6          3 Claims

ABSTRACT OF THE DISCLOSURE

An electrical machine for counting votes utilizing punch card type ballots having an electrical input means, a multi-position switch, a write-in relay connected to one position of the multiposition switch. A party check circuit is included in the machine connected to a second position in the multiposition switch, and a counter and resistor are connected to the switch of the input means and a validity check circuit is connected to the resistor.

---

The present application is a continuation-in-part of my copending application Ser. No. 175,444, filed Feb. 26, 1962.

Conventional mechanical voting machines are extremely complicated and difficult to manufacture, prepare for an election, and use for voting. To manufacture such a machine, it is usually necessary to manufacture thousands of small, specially formed parts first, and then assemble these parts by a long and tedious operation. These machines are subject to frequent breakdowns while in use, and often a voter who is using one of them when it does break down has his vote invalidated because of the impossibility of checking whether the vote was registered in the machine or not. Therefore, one of the principal objects of the present invention is to provide an electrical device for counting votes which is simple to manufacture and use, employing standard, easily obtained components, and which saves ballots to be checked whenever necessary, and which checks the ballots for validity.

Voting laws vary from state to state, and a voting machine or vote counting machine must be modified when used in different states. A difficulty with many conventional machines is that they require extensive modifications to change them, for example, from machines rejecting entire ballots to machines rejecting only portions of ballots, and therefore several different models of the machines must be manufactured for sale to the different states, increasing the cost of manufacturing the machine. It is therefore an additional object of the present invention to provide an electrical vote counting machine which performs validity checks and which is easily modified from one type of operation to another in a few minutes to conform to the requirements of the various states.

An additional object of the invention is to provide a versatile vote counting machine in which the operation is readied by the election officials and initiated by the voter, but in which the operation itself is completely automatic and secret after the insertion of a valid ballot, and in which all control by the election officials is visible to the voter and to other persons in the room.

Still another object of the invention is to provide an electrical vote counting machine of the above type which has few moving parts, is simple in construction and operation, and which is relatively small and easily stored when not in use.

A further object of the invention is to provide a vote counting machine which retains a copy of every valid ballot having a write-in vote in a separate compartment from other ballots for ready tabulation of the write-in votes.

Another object of the present invention is to provide a vote counting machine utilizing ballots which are simple to use, thus reducing confusion and nervousness in the voter.

Yet another object of the invention is to provide a vote counting machine which may be used for secret and declared primaries and general elections, in any state, and which is adapted for the simultaneous handling of votes for a single man for some offices; of votes for several men for some offices; of cumulative voting on an office, i.e. voting in which the number of people voted for on any particular ballot determines the number of votes given each candidate voted for on that ballot; and of votes on propositions.

Additional objects and advantages of the present invention will become apparent from the following description and accompanying drawings, wherein:

FIGURE 5 is a section of the mechanism of the preceding figure taken along line 5—5 of FIGURE 4;

Figure 7:
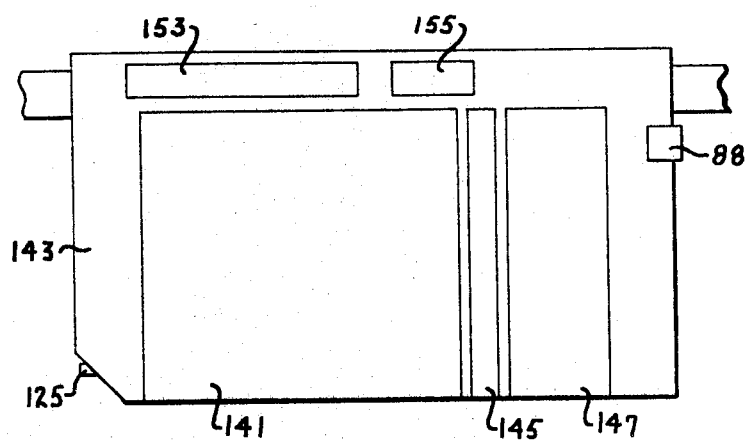
Figure 8:
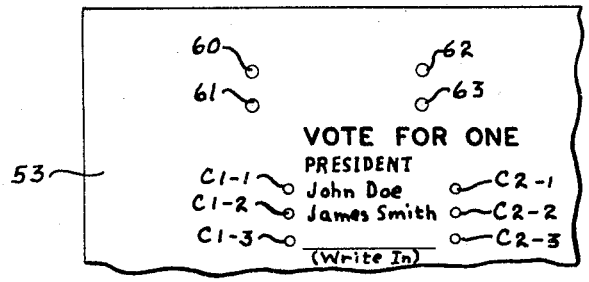
Figure 9:
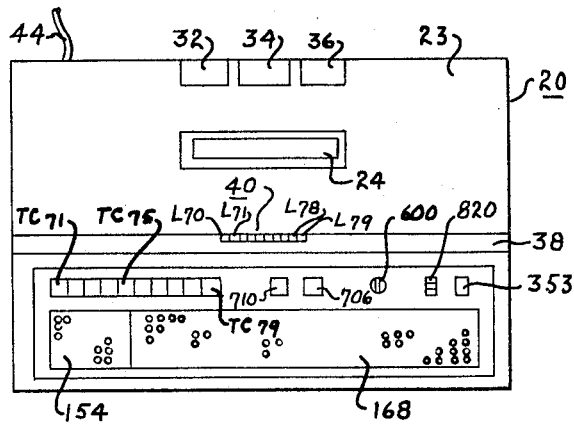
Figure 11:
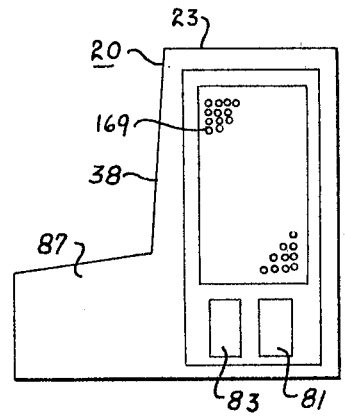
Figure 10:
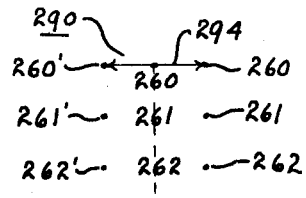

FIGURES 6a through 6h, inclusive, comprise a schematic diagram of the invention;

FIGURE 7 shows the surface of a ballot holder utilized in the present invention;

FIGURE 8 is a view of a portion of the ballot used with the invention showing it in form to be used for voting;

FIGURE 9 is a top plan view of the cabinet with a cover open;

FIGURE 10 is a schematic diagram of a portion of one of the blanks of a stepping switch utilized in the present invention; and FIGURE 11 is a side elevational view of the cabinet with a cover open.

The parts of FIGURE 6 are to be organized in the following manner:

FIGURE 6a
FIGURE 6b
FIGURE 6c
FIGURE 6e, FIGURE 6d
FIGURE 6f, FIGURE 6g, FIGURE 6h

Throughout this specification, all relay switches are normally in the position shown, and asusme the opposite position only when actuated. When again released, all relays return to the positions shown. Several stepping switches having one or more banks are used throughout this invention. These switches are similar to those shown on page 438 of the 1964–65 Electronics Buyers' Guide, published in July 1964. Such switches have a wiper for each bank of points, or switches, which connects pairs of points sequentially. These banks of points are arranged in a circular manner; thus, when the last pair of points is bridged by the wiper, the next pair to be bridged by the wiper is again the first pair. Disconnecting a stepping switch from its power source stops the wiper, and to bring it back to its starting position, the switch must be supplied with power for the requisite period of time.

Figure 1:
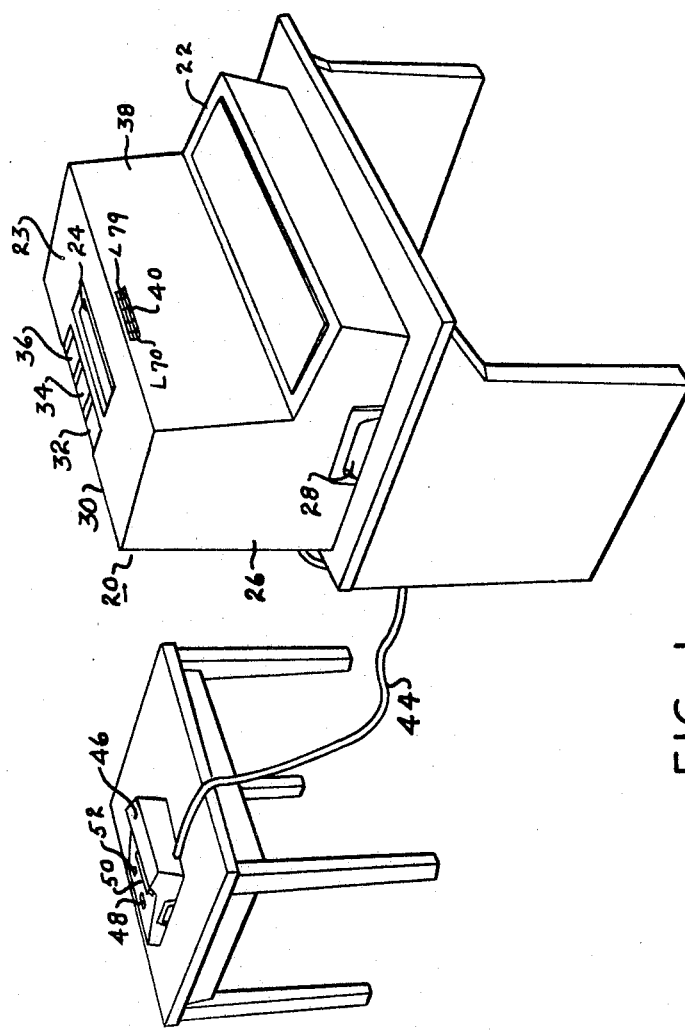
FIGURE 1 is a perspective view of the present invention in position for operation.
Figure 3:
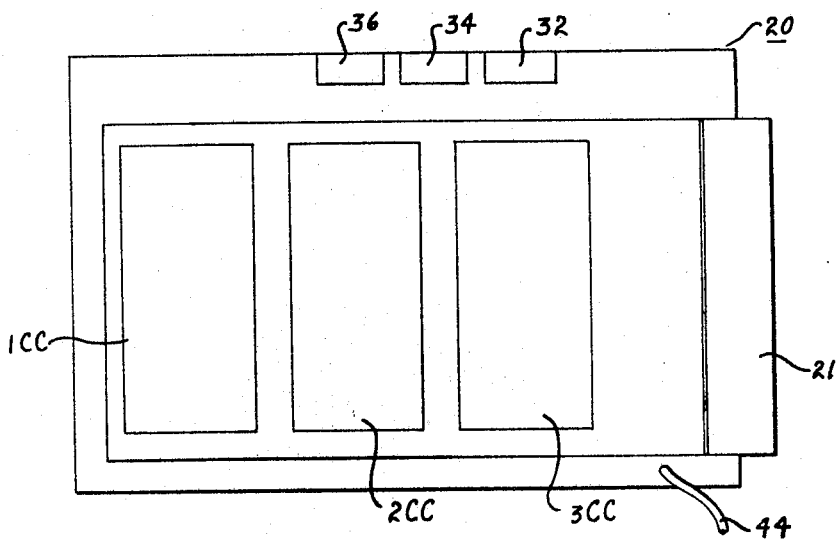
FIGURE 3 shows the back of cabinet 20 with the back cover open to show the counter boards used in the invention.

Referring to FIGURE 1, the present electrical vote counting machine includes a cabinet 20 in which various electrical and mechanical components, to be later described, are mounted. The cabinet 20 has a cover 22 screwed to the cabinet and providing access to the interior of the cabinet, and has an additional cover 21 (shown in FIGURE 3) providing access to the counters of votes. As shown in FIGURE 3, these counters are arranged in three banks, 1CC, 2CC and 3CC, each bank having one counter provided for each possible candidate in an election. On the top 23 of the machine is a slot 24 through which ballots are inserted into the machine, and at the bottom of side 26 is a slot 28 through which invalid rejected ballots leave the machine. On top 23 and extending over edge 30 to the back of the cabinet is a row of three lamps, 32, 34 and 36, lamp 32 being a green "VOTE COMPLETED" lamp, lamp 34 an amber "READY" lamp, and lamp 36 a red "INVALID BALLOT" lamp. On front surface 38 of cabinet 20 is a series 40 of ten lamps, numbered in this application L70, L71, L72, L73, L74, L75, L76, L77, L78 and L79. The operation of lamps 32, 34, 36 and series 40, to be explained later, serves to inform the voter of the status of his ballot and of the control exercised by the officials at the polling place.

Connected to cabinet 20 by a control cable 44 is a control box 46 for the election officials, having mounted on it a reset switch 48, a bank 50 of switches, consisting of switches PS70, PS71, PS72, PS73, PS74, PS75, PS76, PS77, PS78, PS79 and a counter 52 indicating the total number of valid ballots received and processed. The operation of switch 48 and bank of switches 50, also to be explained in detail later, serves to allow the officials to control the times during which the vote counting machine will accept a ballot and to control the party being voted for in a declared primarly election.

Figure 2:
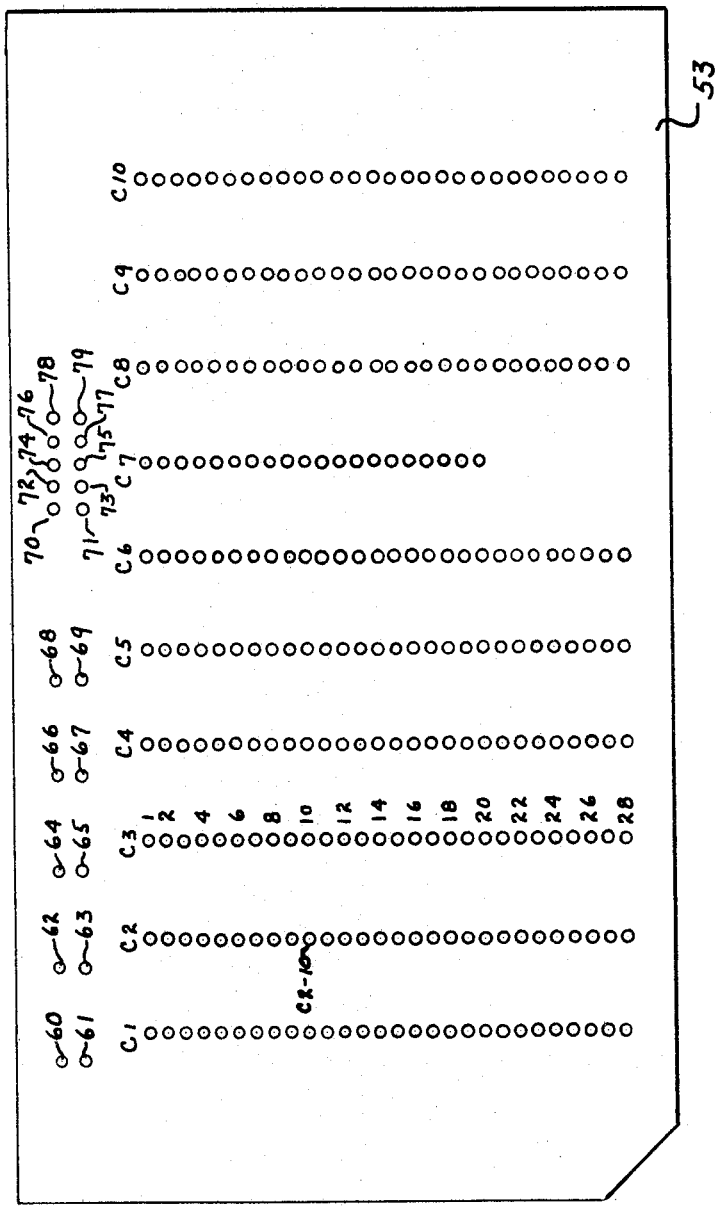
FIGURE 2 shows a blank ballot which may be used with the invention.

Referring now to FIGURE 2, a ballot card 53 contains ten column C1 through C10, colums C1 through C6 and C8 through C10 having twenty-eight positions each, while column C7 has twenty positions. Each position consists of a circle of removable material, used as described later, followed by a space for the name of a candidate or a proposition. The positions are numbered by giving the column number as a prefix to the number assigned to the position by counting from the top of the column. For example, the tenth position down in column C2 is denoted by C2–10. In FIGURE 2, the columns have the column number above the first position of the column, and the even numbered positions of column C3 are numbered. Hereinafter, whenever an arbitrary position from among these positions is discussed, it will be denoted by $C_{i-j}$, $i$ ranging from 1 through 10 and $j$ ranging from 1 through 28. Further, an arbitrary position in one particular column, for example, column C6, will be denated by $C6-j$, with $j$ ranging from 1 through 28. This convention will hold true throughout tihs specification for other combinations of letters followed by numbers $i-j$.

Columns C1 through C6 of the ballot card are used for offices open to candidates in an election, and each column can accommodate at most eight offices. Column C8 is used for propositions and can include nine YES/NO propositions, leaving one position between propositions. Columns C9 and C10 are used for groups, each containing a maximum of twenty-eight candidates and the caption on the ballot reading any desired number of permissible votes to a maximum of ten in the present embodiment, but which may be increased to a maximum of twenty-eight with a small modification of the device. Column C7 is used to list candidates susceptible to cumulative voting, a form of voting used only in Illinois for the office of State Representative. In this form of voting, the colmn containing the list of candidates for the General Assembly is captioned "Vote for Three." If a voter designates only one candidate, manual tabulators or machines must assign three votes to that one candidate. If a voter selects two candidates, each must be given one and one-half votes. If the voter chooses three, each is to receive one vote. Finally, if he indicates more than three candidates, the ballot is to be rejected. In all states except Illinois, column C7 may be used for other purposes.

During a general election the ten positions 60 through 69 located in the upper left corner of ballot 53 are used for indicating straight party votes. None of the ten closely spaced positions 70 through 79 near the top center of the ballot are used in a general election. For a primary election, each ballot has one of the positions 70 through 79 pre-punched and labeled with the name of one of the parties running in the election, with the printing on the ballot informing the voter which party the ballot is good for. Positions 60 through 69 are not used in primary elections.

In the present embodiment of the invention, a vote is indicated on the ballot by punching holes in the circles corresponding to the positions of the candidates voted for. With modifications, the invention may use pencil marks, by merely changing the readout mechanism within the machine.

In general, when the ballot is slipped into slot 24, it drops into a ballot holder which carries it onto a sensing device of conventional form for punched cards. A clip 88 near the top and to one side of the holder guides the ballot into place on the holder and retains it as the holder moves. Once the fingers of the sensing device have entered the holes of the ballot, the remaining action of the voting machine is under control of a stepping switch, which cycles three times before completing the counting of the votes. During the first cycle, the machine checks the ballot for validity, determining whether it has too many party votes, cumulative votes, votes on any propositions, votes in any group, or votes for any office. During the second cycle, the validity checks are completed and the ballot is either rejected or retained. Also during the second cycle, the counters on all offices receiving both a straight party vote and a contradictory individual vote are deactivated. At the end of the second cycle, the straight party votes on all remaining offices are registered on the counters. Finally, during the third cycle, the individual votes on all remaining offices are registered on the counters.

After all votes have been registered on the counters, the sensing device disengages, the ballot holder returns to its starting place, and the ballot is immediately dropped into a chute 80. If no write-in votes have been detected during the counting procedure, the ballot falls through chute 80 into a box 81 within the machine. If a write-in vote has been detected, however, before the ballot is dropped, a partition 82 is moved across chute 80 and the falling ballot is directed into a second box 83 for ballots having write-in votes, thus separating the valid ballots with write-in votes for manual tabulation later. If the ballot is rejected, a process to be more fully described later, a second partition 84 is moved across the chute and the ballot holder moves away from the sensing device before the end of the second cycle; thus no invalid votes are recorded. The ballot falling through the chute is directed by the second partition into a reject chute 85 and thence from the voting machine through slot 28. Boxes 81 and 83 may be removed from the machine through openings in side 87 (FIGURE 11).

Figure 4:
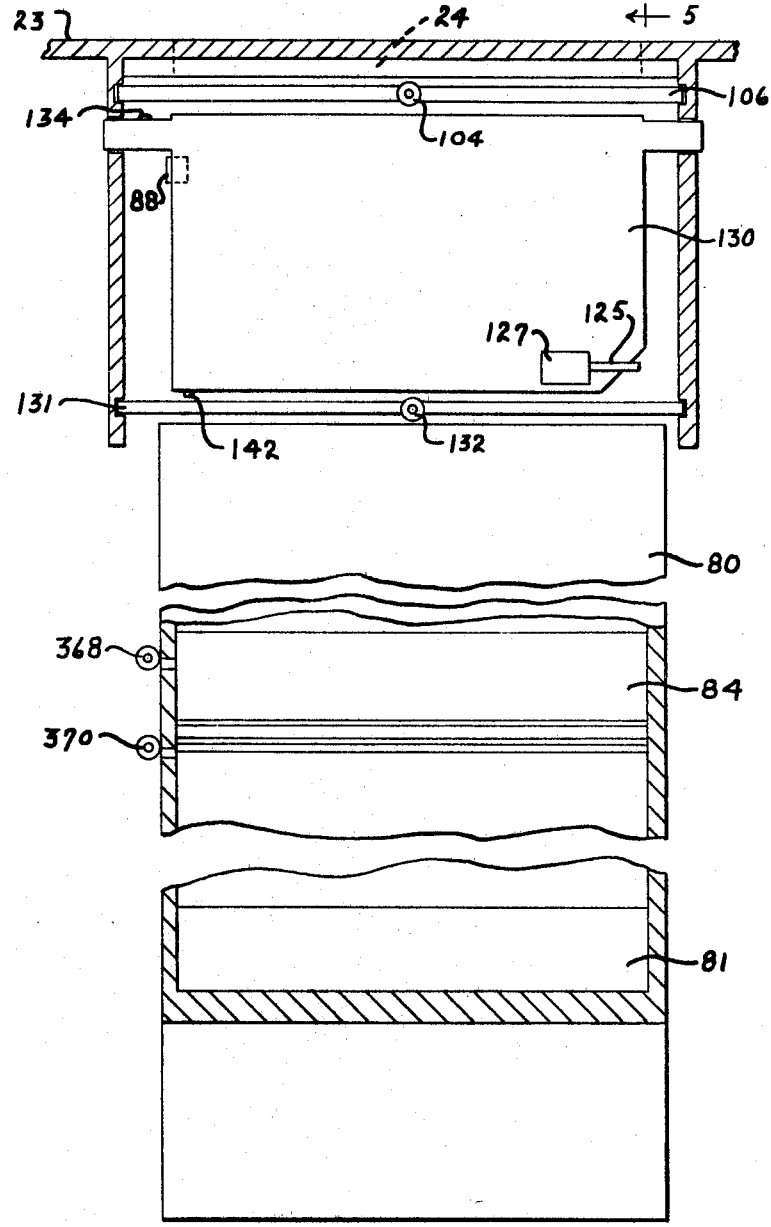
FIGURE 4 shows a back view of the ballot handling mechanism used in the present invention.

Referring to the drawings in detail, and to FIGURES 4, 5 and 6a in particular, when reset bar 48 is depressed, reset relay 90 is energized for 100 milliseconds by timing device 92 and then released again. Relay 90 shifts switches 94, 96 and 98 from the positions shown to the opposite positions. Switch 94 permits power to flow from power source 100 through cover solenoid 104 to ground 102. Solenoid 104, when thus activated, opens cover 106, uncovering slot 24 and allowing a ballot to be placed in the voting machine. Projection 108 of cover 106 closes sensing switch 110, thus providing a self-locking ground 112 for solenoid 104 and "READY" lamp 34. Switch 96 of reset relay 90 brakes the self-lock path for a vote completed relay 114 and prepares it for a new cycle. Finally, switch 98 of relay 90 breaks the self-lock circuit for a power relay 116, releasing switches 118 and 120 and allowing them to move to the positions shown in FIGURE 6a. Since switch 118 is moved to the illustrated position when reset relay 90 is released again, no power can flow from DC power source 100 to relay 116, and the relay remains in the released position. Furthermore, since switch 120 is moved to the illustrated position, operating power buss 124 is cut off from power source 100 and receives no voltage.

When ballot 53 is inserted through slot 24, it drops along the face of ballot holder 130 until it rests on a drop cover 131 openable to release the ballot by a drop solenoid 132, as in hereinafter described. As it drops, the ballot brushes against actuator 125 of a sensitive switch 127 having a normally closed switch 126 and a normally open switch 128, as seen in FIGURE 6a. Switches 126 and 128 are connected together by a rod 129. As the outer end of actuator 125 is rotated downward by ballot 53, rod 129 moves upward, opening switch 126 and closing switch 128. These switches remain in this position until the ballot falls from the sensing device when cover 131 is opened, whereupon the switches return to the illustrated positions.

When switch 126 opens, solenoid 104 releases, and a spring 133 forces plate 106 shut. With plate 106 shut, switch 110 opens and "READY" lamp 34 turns off. In addition, the closed switch 128 energizes a holder solenoid 134, moving ballot holder 130 into contact with pins 135 of portion 136 of sensing device 140. Portion 136 is similar in construction to the sensing device shown in FIGURE 20 of Patent No. 2,411,645 to Whetstone, issued Nov. 26, 1946, and will not be described in detail herein.

Each position Ci–j and 60 through 79 of ballot 53 controls a switch in readout device 140, shown schematically in FIGURE 6b. The switch corresponding to arbitrary position Ci–j of ballot 53 is represented by a pair of spaced points herein numbered SCi–j, this number being merely the number Ci–j with the prefix S. SCi is the number of the column of switches corresponding to column Ci of ballot 53. Thus, for example, the switch controlled by position C3–17 of ballot 53 is numbered SC3–17. Finally, the switches corresponding to positions 60 through 79 are numbered S60 through S79, respectively.

Each of the switches SCi–j and S60 through S79 consists of one of pins 135 in portion 136 and one of opposed conducting plates 141, 145, 147, 153 and 155 mounted on the surface of ballot holder 130 (FIGURE 7). In FIGURE 6b, the point on the right in any of the pairs of points represents one of pins 135, while the point on the left is connected with others in the column and indicates one of the conducting plates.

As seen in FIGURE 6b, columns SC1 through SC6, SC9 and SC10 consist of twenty-eight switches each, column SC7 of twenty switches, and column SC8 of eighteen switches arranged in pairs having a space between pairs. Switches S60 through S69 are placed in the upper left hand corner of readout device 140, and switches S70 through S79 in the upper right hand corner, corresponding to the placement of positions 60 through 79 on ballot 53.

In the present invention, several devices are attached to each of the switches SCi–j; in particular, a candidate identifying multiposition switch SPCi–j, a resistor RCi–j, and a jack JCi–j. For clarity, each of these elements is herein given the same number i–j as the switch SCi–j to which it is connected, with a distinctive prefix. Thus, for example, switch SC1–2 is connected to candidate identifying multiposition switch SPC1–2, a resistor RC1–2, and a jack of a connector board 168.

The point on the right in any of the pairs of points in FIGURE 6b represents schematically one of the pins 135 and is connected to the circuitry, as will be described hereinafter. The points on the left of the pairs of points in columns SC1 through SC6 represent a conducting plate 141 mounted on the surface 143 of ballot holder 130. Similarly, the points on the left in column SC8 represent a conducting plate 145 on surface 143, and the points on the left in columns SC9 and SC10 represent a conducting plate 147 on surface 143. Finally, the points on the left of the pairs 60 through 69 represent a conducting plate 153 and those of the pairs 70 through 79 represent a conducting plate 155 on surface 143. As seen in FIGURE 6b and more fully described hereinafter, plates 141 and 147 are wired together and to a ground 150 under the control of a relay 152. Plates 145 and 153 are wired directly to ground. Finally, plate 155 is connected through a relay 870 to buss 124.

In the operation of the readout device, the unpunched positions of the ballot interpose the cardboard of the ballot between the pins of the corresponding positions SCi–j and plates 141, 145, 147, 153 and 155, thus preventing the completion of the circuit. However, in a position punched by the voter to indicate his vote, the pin 135 passes through the hole provided and contacts its corresponding plate, thus bridging the gap between the points of the pair in FIGURE 6b corresponding to that position. Thus, the pairs of points of FIGURE 6b represent switches controlled by the punching or non-punching of ballot 53.

A projection 142 on the lower edge of ballot holder 130 contacts a switch 144 to close it when the ballot holder 130 is moved toward portion 136; switch 144 remains closed until the ballot holder returns to its starting position. Switch 144 reactivates relay 116 through a 50 millisecond pull-in delay 146 and thus applies voltage to operating buss 124 at the end of the delay. The application of voltage to the operating buss causes the remaining circuits to begin operation, thus permitting counting operations and validity checks on the ballot.

Referring now to FIGURES 6b, 6c, 6d and 6g, each switch SCi–j in columns SC1 through SC6 is connected to each of four points: first, to its individual counter in each of the counter boards 1CCa, 2CCa and 3CCa; second, to its own candidate identifying multiposition switch SPCi–j; third, through a resistor RCi–j and a jack JCi–j of a connector board 168 to a validity check circuit to be described later; and fourth, to a connector board 169a. To conserve space in FIGURE 6, the individual counters in counter boards 1CC, 2CC and 3CC and the jacks in connector board 169 are represented by a single line passing through the box representing the board. Further, the portions 1CCa, 1CCb, 1CCc, 2CCa, 2CCb, 3CCa and 3CCb, as well as 169 a, b and c are referred to collectively as counter boards 1CC, 2CC and 3CC and connector board 169.

Each switch SC7–j is connected to each of three points: first, to its own candidate identifying multiposition switch SPC7–j; second, to its individual counter in counter board 1CCc; and third, to a validity check circuit to be described later. Each switch SC8–j is connected to each of three points: first, to a validity check circuit to be described later; second, to its individual counter in each of the counter boards 1CCb, 2CCb and 3CCb; and third, to a connector board 169b. Finally, each switch SCi–j in column SC9 or SC10 is connected to each of four points: first, to its own candidate identifying multiposition switch SPCi–j; second, to a validity check circuit to be described later; third, to its individual counter in each of the counter boards 1CCb, 2CCb and 3CCb; and fourth, to connector board 169b.

Although the present invention has a theoretically unlimited capacity in the number of parties that can be accommodate in a primary election, in fact the number of parties is limited by the number of counter boards available, since each party must have a counter board of its own. The choice of which of the counter boards 1CC, 2CC or 3CC operates when a signal reaches it from one of the switches SCi–j is determined by a portion of the circuitry of FIGURE 6a, to be described later. If additional counter boards are considered desirable, they may be connected to the voting machine through connector board 169 located in an opening of side 87 of the invention (FIGURE 11).

Figure 6C:
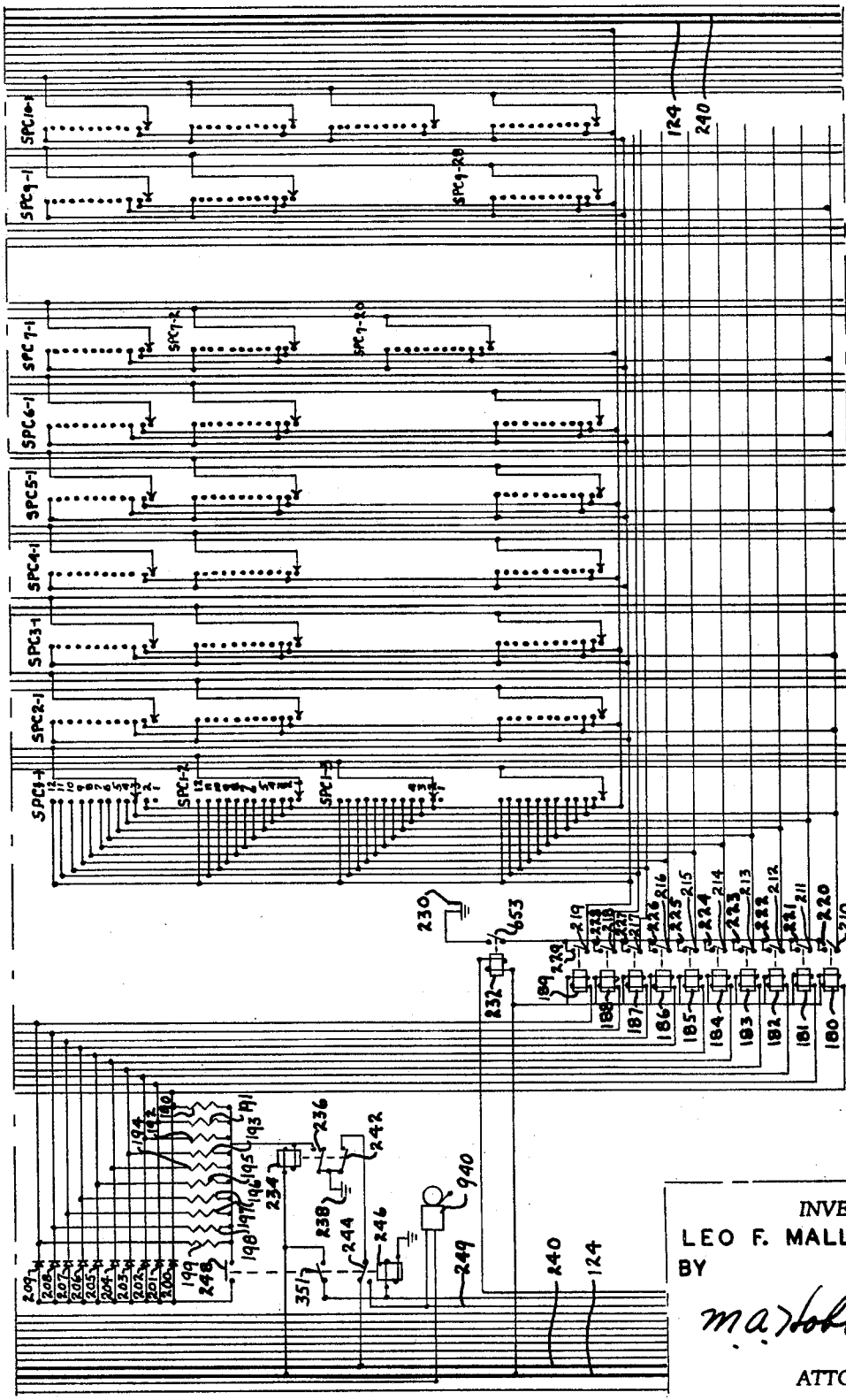

Each of the multiposition switches SPC*i–j* consists of a wiper arm, connected to the switch SC*i–j* corresponding to the multiposition switch, and twelve positions, denoted by the designation of the multiposition switch followed by the position numbered from the bottom of the switch in FIGURE 6c, and they are thus numbered SCP*i–j*–1 through SCP*i–j*–12. Position SPC*i–j*–1 is not connected to anything. Position 2 of all of the switches SPC*i–j* are connected together and to write-in relay 170, to be described more fully hereinafter.

Referring to FIGURES 6b and 6c, the party check circuit is used to detect and identify the presence of a straight party vote during a general election and also to reject a ballot if more than one such vote is present. Each of the contact switches S60 through S69, grounded on the left side in FIGURE 6b by ground 172, is connected to one of the party relays 180 through 189, one of the resistors of equal value 190 through 199, and one of the isolating diodes 200 through 209. Contacts 210 through 219 of relays 180 through 189, respectively, are connected to each of the multipoint switches SPC*i–j*, with contact 210 connected to position 3 of every one of the multiposition switches, contact 211 to position 4, and all other connections made in like manner through contact 219 connected to position 12. Terminals 220 through 229 are connected together and to ground 230 through party relay 232. The circuits for all of the switches S60 through S69 are identical, and therefore only the circuit for switch S60 will be described herein. Whenever switch S60 is closed, relay 180 is activated, permitting contacts SPC*i–j*–3, and hence the counters connected to the switches having their wipers on position 3 to receive a ground from ground 230 whenever relay 232 is activated.

To provide a straight party validity check, party control relay 234 is connected to the remaining end of each of resistors 190 through 199. The resistance of each of the resistors is determined in such a manner than when current flows from operating buss 124 through relay 234, one of the resistors, and to ground 172 through its corresponding switch, relay 234 is not activated. However, since resistors 190 through 199 are wired in parallel and have equal value, if two or more of the switches S60 through S69 are closed, the current through the coil of relay 234 is increased by a factor of two or more and the relay is activated. When relay 234 is activated, it self-locks through contact 236 and ground 238, and it grounds reject buss 240 through contact 242 of relay 234, contact 244 of a control circuit relay 246 and ground 238.

If only one party vote is present, relay 234 is not activated until control circuit relay 246 operates at the end of the first cycle of the main stepping switch. When relay 246 is activated, however, contacts 244 and 248 are moved to the positions opposite those shown, activating relay 234 through diodes 200 through 209, but failing to ground reject buss 240, since contact 244 has shifted to ground line 249.

As seen in FIGURES 6b, 6c and 8, the first three positions C1–1 through C1–3 of column C1 of ballot 53 are devoted to the office of President, with John Doe of the Straight Party ticket, an Independent James Smith, and a space for a write-in vote. In order that a straight party vote, indicated by punching a hole in position 60 on the ballot, may ground the counter connected to switch SC1–1, switch SPC1–1 is set to position SPC1–1–3. Since James Smith is an Independent, no straight party vote may affect his counter, and switch SPC1–2 is left set at position SPC1–2–1. Finally, switch SPC1–3 is set to position SPC1–3–2; thus, when position C1–3 of the ballot is punched to indicate a write-in vote, relay 170 is actuated to initiate the action directing the ballot into box 83.

As seen in FIGURES 6a, 6b, 6d, 6e and 6f, the instant that ballot holder 130 seats ballot 53 and voltage is applied to operating buss 124, the office validity check circuit (FIGURES 6d and 6e) starts to check all of the offices to determine whether any of them has received more than one vote. In FIGURE 6d, resistors RC1–1 through RC6–28 lead to a connector board 168, each resistor RC*i–j* leading to a separate jack JC*i–j*. All jacks assigned to one office are patched together by a patch panel or any convenient means. Thus, as before, switches SC1–1, SC1–2 and SC1–3 may be assigned a single office, and jacks JC1–1, JC1–2 and JC1–3 patched together and connected to plug 252, as seen in FIGURE 6d. All of the resistors RC1–1 through RC6–28 have the same value. Thus, when current flows through the circuit, if more than one vote was placed in an office, the current flowing is two times or more greater than if only one vote is cast.

As seen in FIGURES 6d and 9, a patch panel 154 having forty-eight jacks is provided under cover 22. Each of the forty-eight offices it is possible to vote for using columns C1 through C6 is assigned one of these jacks. Each of these jacks is plugged into board 168, each jack connecting to one of the collections of jacks JC*i–j* patched together and representing one office on ballot 53.

A main stepping switch 292 having six banks of points of thirty pairs each is used in the present invention to carry out the validity checks on the ballot and serves as one of the main controlling elements of the timing system of the present invention, to be more fully explained hereinafter. The following numbering convention is used for the banks of switch 292 and other stepper switches shown in the various parts of FIGURE 6; each pair of points in a bank is denoted by a number between the points of the pair. This number is the numeral referring to the point on the right of the pair of points; the point on the left is referred to throughout this specification by the same numeral prime. Thus, in FIGURE 10, bank 290 of stepper switch 292 is shown, including the first three pairs of points having the numbers 260, 261 and 262, respectively, between the points of the three pairs. As seen in the figure of the pair of points having the numeral 261 between them, the point on the left is actually numbered 261' while the point on the right receives the numeral 261. This holds true for all pairs of points on all banks of all stepping switches used in the present device.

As seen in FIGURE 6e, each of the forty-eight jacks of the patch panel 154 is connected to one of contacts 261 through 272, 274 through 279 or 281 through 286 of a thirty-position bank 290 having a wiper arm 294 of main stepping switch 292, or to contacts 301 through 312, 314 through 319 or 321 through 326 of a thirty-position bank 330 of stepping switch 292 having a wiper arm 332. Opposite contacts 261' through 272', 274' through 279' and 281' through 286' of bank 290 are connected together and to switch 334 of relay 336, while contacts 301' through 312', 314' through 319' and 321' through 326' of bank 330 are connected together and to switch 338 of relay 340.

Figure 6F:
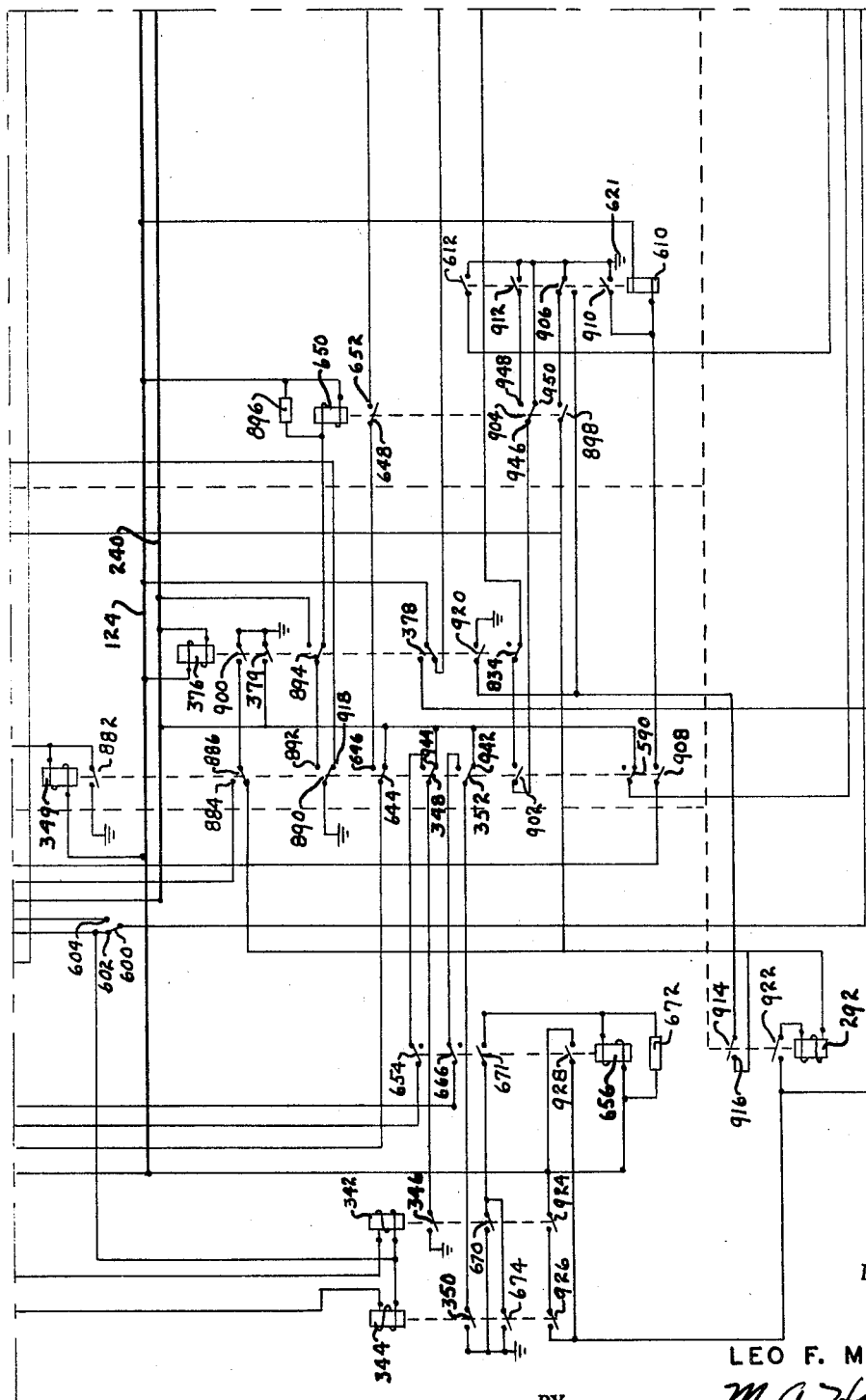

During the first cycle of stepping switch 292, relays 336 and 340 have not been actuated, and the switches controlled by them are in the positions shown in FIGURE 6e. In addition, contact 335 of switch 334 is connected to a relay 342, while contact 337 of switch 338 is connected to a relay 344. Therefore, if more than one vote is registered in an office, producing a current flowing through the circuit having twice the value of a current caused by a single vote in the office, the current flowing through wiper arm 294 or 332, and switch 334 or 338, respectively, actuates relay 342 or 344 (not actuated by the current caused by a single vote). Actuation of relay 342 grounds reject buss 240 through switch 346 of relay 342 and switch 348 of a relay 349, while actuation of relay 344 grounds buss 240 through switches 350 and 352 of relays 344 and 349, respectively, as seen in FIGURE 6f.

Point 288 of bank 290 of relay 292 is connected to relay 246, shown in FIGURE 6c, while point 288′ is connected to buss 124. Thus, as wiper 294 completes its first cycle along bank 290, it connects points 288 and 288′, activating relay 246, whose action was described previously. Relay 246 then self-locks through a switch 351 and remains in operation until operating buss 124 is cut off from its voltage source by relay 116 as described earlier.

Referring now to FIGURE 6a, when buss 240 is grounded, "INVALID BALLOT" lamp 36 lights, counter 353 for invalid ballots operates, current flows through an isolating diode 354 to a disengage relay 356, and current flows through isolating diode 358 and unlock relay 360, which operates switches 362 and 364. A reject solenoid 368 is connected to switch 364; thus, when switch 364 is closed, current flows from operating buss 124, through reject solenoid 368 and switch 364 to grounded buss 240. Reject solenoid 368 is connected to partition 84 and moves it into a position across chute 80 to direct the ballot into reject chute 85, as described previously, to issue from the machine through slot 28.

It should be noted at this point that a write-in solenoid 370, which also receives voltage from buss 124, is mechanically connected to partition 82 to move it across chute 80 and direct the ballot into box 83 as described previously. Solenoid 370 is connected to ground through switch 362 of relay 360 and switch 372 of write-in relay 170. However, as seen in FIGURES 6a and 6f, write-in 170 is connected to switch 378 of a reject relay 376. The grounding of reject buss 240 actuates reject relay 376, operating switch 378 and deactivating relay 170, thus preventing write-in solenoid 370 from operating. Reject relay 376 also self-locks through switch 379 of relay 376.

At the same time that reject solenoid 368 is positioning the partition for subsequent disposition of the ballot, disengage relay 356 is disengaging the ballot from the readout fingers of readout device 140 and preparing to drop the ballot through slot 28. Switch 380 of relay 356 cuts the circuit for holder solenoid 134 and a spring 381 disengages the readout pins 135 and returns holder 130 to its original position. Switch 382 of relay 356 removes voltages from counter 52 in officials' control box 46 and energizes drop solenoid 132. After a 200 millisecond delay, caused by timer 384, solenoid 132 releases ballot 53 and the ballot drops from holder 130 through slot 28. During these operations, switches 126 and 128 held in the opposite positions by the ballot and 144 held closed by holder 130, return to the positions indicated schematically in FIGURE 6a. However, power relay 116 is self-locked through switches 98 and 118, and it will remain in operation until officials reset switch 48 is closed as described earlier.

Figure 6G:
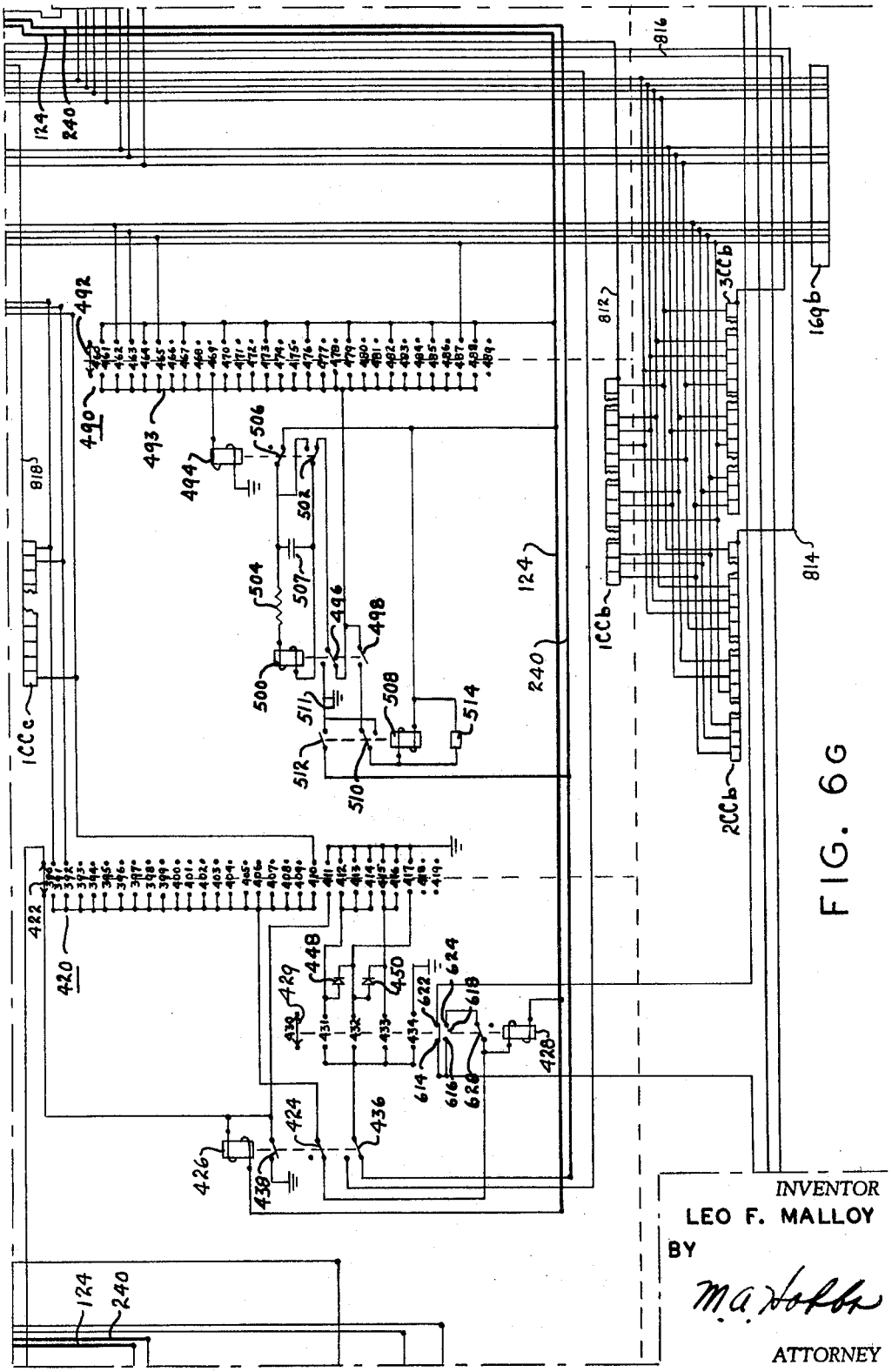

Referring now to FIGURE 6g, switches SC7–1 through SC7–20 are connected to contacts 391 through 410 of bank 420 with wiper 422 of main stepper switch 292. Contacts 391′ through 410′ of bank 420 are connected together and through a switch 424 of a relay 426 to a stepping switch 428 having a wiper arm 429.

Each time wiper arm 422 connects one of the contacts 391′ through 410′ with a ground or vote, current flows from buss 124 through switch 424 to actuate relay 428. Therefore, relay 428 steps once for every vote in column C7, while if not votes are present, relay 428 will remain in the position shown. Since the maximum number of votes allowed in cumulative voting in the one state using the method is three votes, if four votes are detected, reject buss 240 is grounded through switch 436 of relay 426 and contacts 434 and 434′ of relay 428. If one vote is detected, wiper arm 429 connects contacts 431 and 431′; with two votes, it connects contacts 432 and 432′; and with three votes, it connects contacts 433 and 433′. When wiper arm 422 of bank 420 connects contacts 411 and 411′, buss 124 is grounded through relay 426 and the current flowing actuates the relay, which then self-locks through switch 438. When wiper 422 connects contacts 390 and 390′ again, a relay 440, shown in FIGURE 6e, receives a ground from switch 438 and self-locks through switch 442 and ground 444.

When relay 426 operates, 424 opens, and stepper 428 necessarily remains in the position indicated by the number of votes detected. Also, contacts 431′ through 434′, connected together and to switch 436, are switched from reject buss 240 to switch 879 of vote completed relay 114 (FIGURE 6a).

Contact 431 of relay 428 is connected directly to contacts 412′, 413′ and 414′ through an isolating diode 448 to contact 417′, and through isolating diodes 448 and 450 to contacts 415′ and 416′. Contact 432 of relay 428 is connected directly to contact 417′ and to contacts 415′ and 416′ through isolating diode 450, but it is isolated from contacts 412′ through 414′ by diode 448. Contact 433 of relay 428 is connected directly to contacts 415′ and 416′, but it is isolated from the other contacts by diode 450. Thus, if wiper 429 is connecting contacts 431 and 431′, six pulses pass through switch 436 as wiper 422 passes contacts 412 through 416; if wiper 429 connects contacts 432 and 432′, three pulses pass; and if it connects contacts 433 and 433′, two pulses pass. When relay 114 is activated, the next following sweep of bank 420 by wiper 422 pulses cumulative counter relay 452 (FIGURE 6a), closing switch 454 the appropriate number of times, and causing the counters corresponding to the men voted for to advance two, three or six times in accordance with the number of such men.

In constructing this circuit, the unit has been considered to be the half-vote, allowing conventional counters to be used, since the proper vote total may be obtained for each candidate by simply dividing the indicated total by two. However, if legal requirements persist in demanding counters indicating the exact total, counters having half-unit wheels for the primary input wheels, with all other wheels being decimal wheels, may be used without changing the circuit described herein.

One position of column C8 of card 53 is left vacant between each pair of YES/NO positions; thus, only positions SC8–2, 3, 5, 6, 8, 9, 11, 12, 14, 15, 17, 18, 20, 21, 23, 24, and 26 and 27 of column C8 may be used for propositions. These switches of readout device 140 are connected to counters 1, 2 and 3CC8–j, j=2, 3, 5, 6, 7, 8, 9, 10, 11, 12, 13, 14, 15, 16, 17, 18, 19, 20, 21, 22, 23, 24, 26 and 27 and to connector board 169b. They are also connected to contacts 462, 463, 465, 466, 468, 469, 471, 472, 474, 475, 477, 478, 480, 481, 483, 484, 486 and 487 of bank 490, having wiper arm 492, of stepper switch 292, as shown in FIGURE 6g. The remainder of contacts 461 through 488, i.e. contacts 461, 464, 467, 470, 473, 476, 479, 482, 485 and 488 are connected to buss 124, while all of contacts 461′ through 488′ are connected together by buss 493 and to a proposition reset relay 494 and switches 496 and 498 of a proposition check relay 500.

The circuit shown in FIGURE 6g has no effect on the remaining circuitry of the vote counting machine unless both a "YES" and a "NO" vote are detected for the same proposition, in which case reject buss 240 is grounded. Relay 500 is connected to buss 493 through a switch 502 of relay 494 and switch 496, and it is connected to buss 124 through a resistor 504 and a switch 506 of relay 494 connected in series. Relay 500 has a pull-in delay of 25 milliseconds caused by the RC network formed by resistor 504 and a capacitor 507. The operation of relay 500 causes switch 496 to disconnect relay 500 and buss 493, while switch 498 connects buss 493 to a proposition reject relay 508 through a switch 510. Relay 508 is connected to buss 124 through a pull-in delay timer 514 with a value of 25 milliseconds, and when it is actuated, the relay self-locks through switch 510 to ground 511. Upon actuation, relay 508 operates switch 512 to connect reject buss to a ground through the switch.

In the operation of this circuit, it is to be noted that buss 493 is continuously grounded through the ground for relay 494. However, this ground is not sufficient to actuate either relay 500 or relay 508, since the current flow through these relays is reduced by the resistance of the coil of relay 494. Thus, as wiper arm 492 moves along bank 490, it first connects buss 493 to buss 124 through contacts 461 and 461', actuating relay 494 and clearing the circuitry connected to bank 490. As described previously, a vote for or against a proposition results in a ground appearing at the terminal of bank 490 connected to the switch SC8–j, corresponding to that vote. When wiper arm 492 connects this terminal with its opposite terminal, that ground is connected to buss 493 and a greater amount of current flows through relay 500, actuating it after a delay of 25 milliseconds.

One conventional form of stepper switch has a 40 millisecond delay between each step, and this is the form used in the present embodiment of the invention. Proposition reject relay 508 and relay 500 are both provided with pull-in delays of 25 milliseconds. Since the total delay of these two relays is 50 milliseconds, it is impossible for the same impulse to operate both relays, while the length of delay between each step of the main stepper allows relay 500 to operate on one impulse and relay 508 to operate on the immediately following impulse.

Thus, after relay 500 has been actuated by one vote for a proposition, for example, a "YES" vote, a second vote for the same proposition results in a ground appearing at the immediately following contact of bank 490 and relay 508 is actuated through switch 498 of relay 500 and buss 493. The actuation of relay 508 grounds buss 240 as previously described. If, however, the next impulse on buss 493 is a positive voltage from one of the contacts 461, 464, 465, 466, 467, 468, 469, 470, 471, 472, 473, 474, 475, 476, 477, 478, 479, 480, 481, 482, 483, 484, 485 or 488, the circuitry is cleared and prepared for a check of the next proposition. At the end of the proposition validity check, the circuitry is cleared by the voltage on contact 488, thus preparing the circuitry for actuation of the counters if the ballot has not been rejected.

Figure 6H:
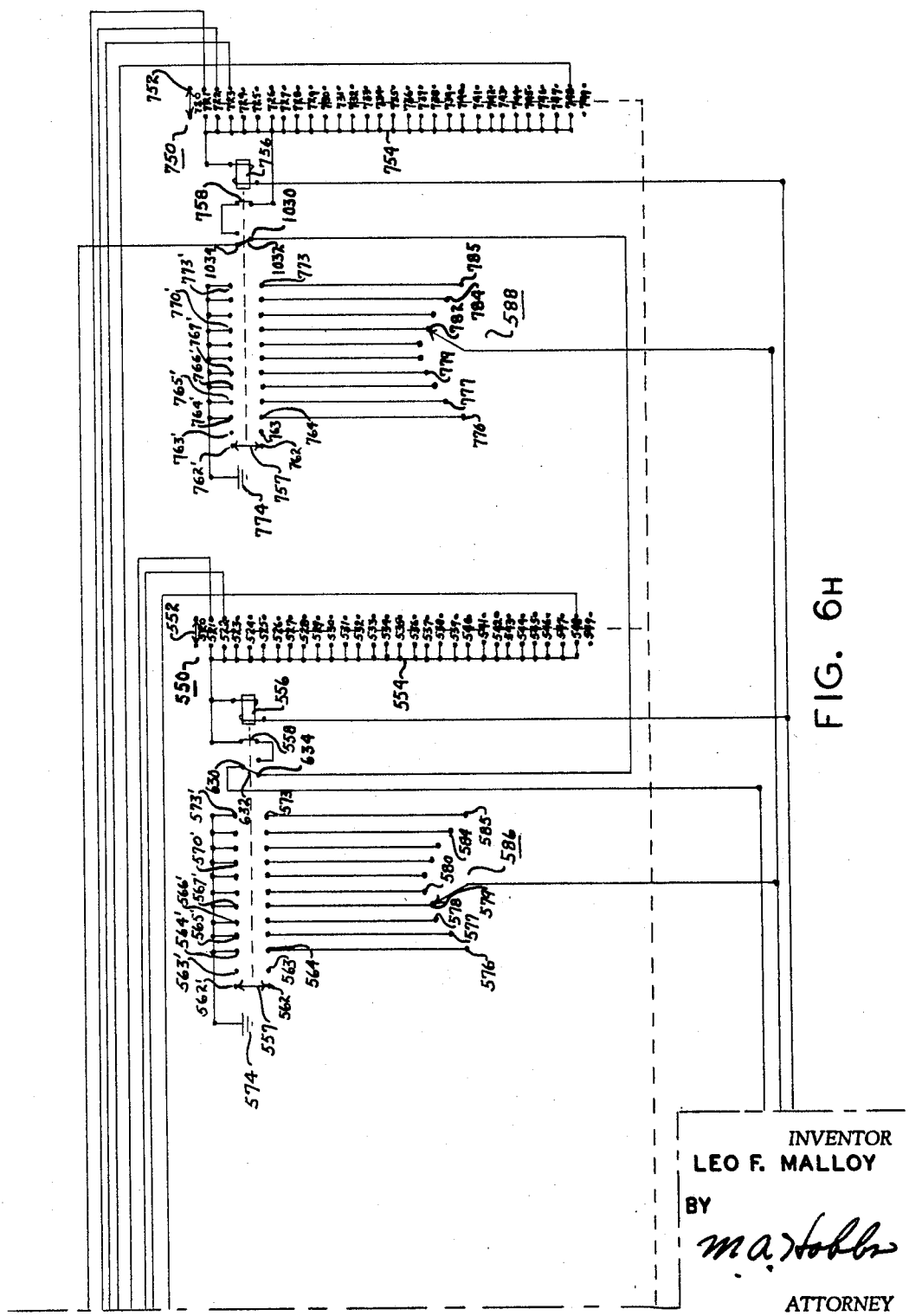

Referring now to FIGURE 6h, the circuits for columns C9 and C10 of ballot 53 are identical within the voting machine, and therefore only that for column C9 will be described herein. Switches SC9–1 through SC9–28 are connected serially to contacts 521 through 548 of bank 550, having a wiper arm 552, of main stepper switch 292. Contacts 521' through 548' are connected together by a buss 554 and to the motor of a twelve-position group stepping switch 556 with wiper arm 557 and to switch 558 controlled by switch 556.

As main stepper 292 cycles, wiper 552 sweeps the positions of bank 550, and grounding buss 554 for every vote detected in column C9 (more contacts may be used if desired), pulses group stepping switch 556 for every vote in that column. Each time switch 556 is pulsed, it advances wiper 557 one position. Thus, if one vote is detected, wiper 557 connects contacts 563 and 563', and if two votes are detected, the wiper connects contacts 564 and 564', etc.

Contacts 564' through 573' are connected together and to ground 574, while contacts 564 through 573 are connected serially to contacts 576 through 585 of a group limit switch 586. The wiper at group limit switch 586 is connected to the wiper of a group limit switch 588 for column C10 and through switch 590 of relay 349 (FIGURE 6f) to reject buss 240.

The circuitry for column C10 is similar to that for column C9, bank 750 of switch 292 having a wiper arm 752 and points 720 through 749 corresponding respectively to bank 550, wiper arm 552, and points 520 through 549; in addition, points 720' through 749' correspond to points 520' through 549', buss 754 to buss 554, and stepping switch 756 with a wiper arm 757 and points 762 through 773 and 762' through 773' to stepping switch 556, wiper arm 557, and points 562 through 574 and 562' through 573'. Finally, switch 588 having contacts 776 through 785 corresponds to switch 586 and contacts 576 through 585, switch 758 to switch 558, and ground 774 to ground 574.

In use, switches 586 and 588 are set to the maximum number of candidates a voter may vote for, counting serially from contact 576 and 776, respectively. Thus, if the ballot reads "Vote for Four," switch 586 is placed on contact 579. Then, when stepper switch 556 has advanced one more time than the maximum allowable number of votes, indicating that the voter voted for too many candidates, reject buss 240 is grounded through 590 and 586 and wiper arm 557. Switch 588 acts in a precisely similar manner for column C10 as switch 586 operates for column C9.

Referring now to FIGURES 6e, 6f and 6h, relays 342 and 344 and stepping switches 556 and 756 receive their voltage from operating buss 124 through switches 592 and 594 of relay 440. With the operating buss 124 connected to contacts 596 and 598, and with switch 600 in the position shown in FIGURE 6f, neither the office validity check circuit nor the group validity check circuit is able to operate until the cumulative validity and tabulating circuit (FIGURE 6g) has completed checking column C7 and has actuated relay 440. Thus, the first two mentioned circuits do not operate until the second cycle of main stepping switch 292. The result, as will be made clear later, is that if both individual and party votes have been entered in columns C1 through C6 or columns C9 or C10, the ballot will be rejected by the previously described mechanism.

If switch 600 is shifted from contact 602 to contact 604, the group validity check circuit completes its checking during the first cycle of main stepping switch 292, and the ballot will be rejected if both a party vote and a conflicting individual vote has been entered in columns C1 through C6, but columns C9 and C10 merely prevent the conflicting party vote from registering, as will be described later.

With operating buss 124 connected to contacts 606 and 608 of switches 592 and 594, and with switch 600 set at contact 604, the office validity check circuit acts during the first cycle of main stepping switch 292, while the group validity check circuit acts during the second cycle, and the results are opposite to those described in the previous paragraph. If switch 600 is set to contact 602, both the group validity check circuit and the office validity check circuit act during the first cycle of the main stepping switch and any vote for an individual conflicting with a straight party vote prevents the conflicting portion of the straight party vote from registering, as will be described later herein.

Referring now to FIGURES 6a, 6f, 6g and 6h, after ballot 53 has been completely processed, an end cycle relay 610, whose action is to be more fully described later, operates a switch 612, thus connecting contacts 614 and 616 of a switch 618 controlled by stepping switch 428 (FIGURE 6g) to ground 621. Switch 618 has the position shown, connecting contacts 614 and 622, only when wiper arm 429 is in the position shown. If wiper arm 429 is connecting any other contacts, switch 618 is connecting contacts 616 and 624, and thus when contact 616 is grounded, switch 428 is grounded through a switch 628. Switch 626 is opened and closed each time stepping switch 428 advances wiper arm 429 and is provided for self-interrupting action. Thus, when switch 428 is grounded, wiper arm 429 advances until it reaches its home position, connecting contacts 430 and 430', and then switch 618 returns to the illustrated position and switch 428 stops.

Contact 622 is connected with contact 630 of a switch 632 controlled by stepping switch 556 (FIGURE 6h).

Switch 632 is in the position shown only when wiper arm 557 is connecting contacts 562 and 562', and it is in the opposite position otherwise. Also, switch 558 is an interrupting switch of the same type as switch 628. Thus, when contact 630 is grounded through switches 618 and 612, stepping switch 556 operates wiper arm 557 until arm 557 connects contacts 562 and 562', at which time switch 632 returns to the position shown and stepping switch 556 stops. Contact 634 is connected to contact 1030 of a switch 1032 controlled by stepping switch 756. Switch 1032 is in the position shown only when wiper arm 757 is connecting contacts 762 and 762', and is in the opposite position otherwise. In addition, switch 758 is an interrupting identical to switch 558; thus, when contact 1030 is grounded through switches 618, 612 and 632, stepping switch 756 operates wiper arm 757 until arm 757 connects contacts 762 and 762', at which time switch 1032 returns to the position shown and stepping switch 756 stops. Contact 1034 of switch 1032 is connected through a diode 636 (FIGURE 6a) to disengage relay 356. When switches 428, 556 and 756 have returned their respective wiper arms to the positions shown in FIGURES 6g and 6h, disengage relay 356 is grounded through diode 636 and switches 1032, 632, 618 and 612 and operates in the previously described manner to release ballot 53 from holder 130.

Referring again to FIGURES 6c, 6e and 6f, line 249 from switch 244 to relay 246 is connected through a switch 640 of relay 336 (FIGURE 6e) and a switch 642 of relay 340 to a switch 644 of relay 349, shown in FIGURE 6f. Contact 646 of switch 644 is connected to switch 648 of a start third cycle relay 650. Finally, contact 652 of switch 648 is connected to party relay 232. Thus, when relays 246, 349 and 650 have been activated, party relay 232 is grounded through switches 648, 644, 642, 640, 244 and 242 to ground 238 and the party relay is activated. Party relay 232 closes switch 653 and connects ground 230 with contacts 220 through 229. If a straight party vote has caused the actuation of one of relays 180 through 189, the corresponding contact 210 through 219, and hence the corresponding one of positions 3 through 12 of multiposition switches SPC*i–j* is grounded. Any of the switches SPC*i–j* which are withdrawn to the grounded contact transmit the ground to the counters and those portions shown in FIGURE 6e, which are connected to those switches SPC*i–j*. This ground is indistinguishable from the ground produced in the same circuits by simple votes for the candidates involved; thus, when the counters are actuated, those counters connected to these grounded circuits operate to count a vote for all of those candidates affiliated with the party voted for without an individual vote for each of the candidates being required.

During the third cycle of switch 292, the grounds due to the operation of relay 232 appear on contacts 261 through 272, 274 through 279 and 281 through 286 of bank 290 (FIGURE 6) and on contacts 301 through 312, 314 through 319 and 321 through 326 of bank 330. For example, if position 60 of ballot 53 has been punched, relay 180 is activated and a ground is transmitted through switch SPC1–1 to the counters for John Doe (see FIGURE 8) and to jack JC1–1, 252 and point 301 in FIGURE 6e. Thus, if any individual votes conflicting with the party vote exist, as wipers 294 and 332 move along banks 290 and 330, relays 342 and 344 operate for each office having such a conflict. As will be described later, since this occurs in the third cycle of switch 292, relays 349, 650 and 440 have been actuated, shifting the switches they control to the positions opposite those shown in FIGURES 6e and 6f and self-locking them.

Since the circuitry of relay 342 in conjunction with relay 336 is identical with the circuitry of relay 344 in conjunction with relay 340, only one of the circuits will be described herein. When relay 342 is actuated by the presence of both a party vote and a conflicting individual vote for an office, relay 336 is grounded through a switch 654 of a disable release relay 656, switch 348 of relay 349, and switch 346 of relay 342. When switch 658 of relay 336 moves, it provides relay 342 with a holding ground equivalent to that provided by the two "votes" from the candidate contact circuits. Switch 334 of relay 336 connects operating buss 124 with the ground side of all of the counters of the office having the conflicting individual vote and part vote, to disable the counters for that office. These counters remain disabled until after ballot 53 is dropped by ballot handling circuit, and as a result the candidate in that office who belongs to the party receiving the party vote will not receive a vote when the counters are subsequently actuated.

To prevent the pulse passing through switch 334 from being grounded in any place other than the counters to be disabled, switches 640 and 660 of relay 336 are provided. Switch 640 acts to break the circuit to party buss actuating relay 232, through the circuit previously described, and thus removes the ground caused by the straight party vote. Switch 660 grounds relay 152 (FIGURE 6b), removing the ground from readout device 140. For relays 344 and 340, the following pairs of switches correspond: 334 and 338; 658 and 662; 640 and 642; 660 and 664; 346 and 350; 348 and 352; and 654 and 666. Since the individual vote is recorded at the end of the second cycle of switch 292, as will be described later, the individual vote, which has precedence over the party vote in a state using the present circuitry, is recorded in all offices, and the party vote is not recorded in an office having a conflicting individual vote.

For a state in which a ballot is rejected if it contains both a straight party vote and a contradictory individual vote, the machine will reject any such ballot by arranging the connections between buss 124 and contacts 596, 598, 606 and 608 (FIGURE 6e) as described previously.

After relay 342 or 344 has been actuated as described, when wipers 294 and 332 move again, relays 342 and 344 must be released again. As seen in FIGURE 6f, the actuation of relay 342 closes switch 670, grounding relay 656 through a switch 671 and a delay timer 672 for a 40 millisecond delay of action. After 40 milliseconds, during which period the above described action takes place, relay 565 operates, opening switch 671 and immediately releasing the switch as the current is cut off from the relay. During the short time relay 656 is operating, switches 654 and 666 open, releasing relays 336 and 340. Thus, switches 658 and 662 open, taking the position shown in FIGURE 6e, and relays 342 and 344 are released for the next position of wipers 294 and 332. For the actuation of relay 344, switch 674 corresponds with switch 670 of relay 342.

If ballot 53 is marked with a write-in vote, as explained previously, a ground appears on one or more of the contacts SPC*i–j*–2, all of which are connected to write-in relay 170 as noted before. Thus, as seen in FIGURE 6a, write-in relay 170 is actuated and self-locks through switches 700 of relay 170 and 378 of relay 376. Contact 702 of switch 704 of relay 170 is connected to a non-write in counter 706, while contact 708 of switch 704 is connected to a write-in counter 710. The opposite side of switch 704 is connected with operating buss 124 through a switch 712 of vote completed relay 114. Thus, when relay 114 operates, either counter 706 or 710 advances, depending upon the position of switch 704.

The actuation of relay 170 also closes switch 714 and connects a diode 716 with diode 636. Thus, when a ground appears on diode 636 during the closing process initiated by relay 610, as described previously, solenoid 360 is actuated through diode 716. This initiates the drop procedure for the ballot as described before, but in this case switch 372 is closed, and buss 240 is not grounded, and therefore write-in solenoid 370 moves partition 82 to a position where the dropping ballot falls into a box reserved for ballots having a write-in vote.

Referring now to FIGURE 6a, a circuit used to select the one counter board that is to be actuated for a voter during a primary election is shown in the lower right hand corner. Each counter board, whether one of the machine's boards (boards 1CCa, b, c; 2CCa and b; 3CCa and b) or a board outside the machine and connected to it through connector board 169, contains two or three groups of counters, with all counters of boards 1CCa, 2CCa or 3CCa connected to lines 806, 808 or 810, respectively, while the counters of boards 1CCb, 2CCb and 3CCb are connected to lines 812, 814 or 816, respectively. Similar connections are made within the external boards (not shown). Counter board 1CC contains an extra group of counters 1CCc, connected to line 818, which are used for cumulative voting. This form of voting occurs only during general elections, and since only one board is required for a general election, board number 1CC is used for such elections.

For a general election, an election type switch 820 is set in the position shown in FIGURE 6a, connecting ground 822 with a relay 824 through switch 826 of switch 820. Relay 824 is also connected with operating buss 124 through switch 828 of disengage relay 356, and therefore, while buss 124 is energized switch 830 of relay 824 is closed until relay 356 operates because a reject ground appears on buss 240 or because a ground appears through diode 636, as described previously. After all validity checks have been completed with the ballot found valid, relays 114 and 376 close switches 446 and 834, grounding and thus actuating relay 452, office counter relay 838 and group and proposition counter relay 840. These relays close switches 454, 842, 844, 846, 848, 850 and 852, allowing the counters grounded by individual votes or by a straight party vote to advance on board 1CC.

For a primary election, selector switch 820 is placed in the position opposite that shown in FIGURE 6a. Ground 822 is then connected through switch 826 to party change switch 860 and from thence is connected to switches PS70 through PS79, corresponding and connected to readout switches S70 through S79. Switch PS70 is also connected to counter relay 824, switch PS71 to a counter board relay 862 of counter board 2CC, and switch PS72 to a counter board relay 864 of counter board 3CC. The remaining switches PS73 through PS79 are connected to connector board 169 to be connected to external counter boards. Each of the ten switches PS70 through PS79 is connected to one of the primary party total counters TC70 through TC79.

Ground 822 is also connected through a switch 866 of switch 820, switch 868 of a primary validity relay 870, and contacts 320 and 320' of bank 330 of stepping switch 292 (FIGURE 6e) to reject buss 240. Relay 870 is connected to ground through any one of switches S70 through S79, a corresponding switch PS70 through PS79, switch 860, and switch 826. During a primary election, one of the ten positions 70 through 79 on ballot 53 is prepunched to correspond with the name of a party printed on the ballot. Each party represented in the primary is assigned a unique position among positions 70 through 79. In a declared primary, when the voter receives his ballot from the election officials, he tells the officials the name of the party he is voting in and the officials give a ballot prepunched to correspond with that party. If the primary is a secret primary, the officials give the voter a pack of prepunched ballots, one corresponding to each of the parties, or the voter may be given an unpunched ballot and asked to punch the party of his choice. In a declared primary, the officials close one of switches PS70 through PS79, corresponding with the party declared by the voter. These switches are mechanically interlocked and connected to a switch 874 so that closing one of the switches PS70 through PS79 closes switch 874 and operates interlock solenoid 876 by allowing current to flow from power source 100, through switch 878 of disengage relay 356, solenoid 876, switches 874, 860 and 826 to ground 822. Solenoid 876 operates a locking pin (not shown) to hold switch 874 and the switch operated by the officials closed and all the other nine switches in the set PS70 through PS79 open. If the voter subsequently inserts the ballot corresponding to the switch pressed by the official, the switch of the set S70 through S79 corresponding to the switch closed by the officials is closed, and relay 870 opens switch 868 before wiper 332 connects contacts 320 and 320'. However, if the pallot does not correspond to the switch pressed by the officials, relay 870 fails to operate. With switch 868 closed, when wiper 332 connects contacts 320 and 320', reject buss 240 is grounded, and the ballot is rejected.

In a secret primary, all of switches PS70 through PS79 are locked closed permanently and a single hole punched in position 70 through 79 in the ballot 53 operates relay 870. The circuit closed by switches in sets S70 through S79 and PS70 through PS79 operates a lamp from the set of lamps L70 through L79 wired in series with switches S70 through S79, respectively, and grounds one of the counter relays 824, 862 or 864, or one of the jacks of board 169. Thus, the counter board for the proper party is actuated.

Party total counters TC70 through TC79 are also connected with switches S70 through S79. The other side of these counters is connected with buss 124 through switch 879 of relay 114. Thus, when relay 114 is actuated, the counter assigned to the party voted in on the ballot advanced, gives the total number of valid ballots for the party assigned.

As has been described, when relay 426 (FIGURE 6g) is operated during the first cycle of stepping switch 292, it grounds contact 390' of bank 420, and thus when the second cycle of switch 292 begins, relay 440 is actuated, self-locking through switch 442 (FIGURE 6e). Referring now to FIGURES 6e and 6f, relay 440 operates switch 880 connected to point 329' of bank 330 of switch 292, to ground that point. Relay 349 and switch 882 of relay 349 are connected to contact 329 of bank 330, and thus at the end of the second cycle of switch 292, when wiper 332 reaches contact 329, relay 349 is actuated and self-locks through switch 882. Contact 884 of switch 886 of relay 349 is connected to contact 330' of bank 330, and contact 300 is connected to relay 114 (FIGURE 6a). Thus, at the beginning of the third cycle of switch 292, after relay 349 has shifted switch 886 and wiper 332 has connected contacts 300 and 300', relay 114 operates and self-locks through a switch 888. "VOTE COMPLETED" lamp 32 is also grounded through switch 888 and lights. Thus, the voter is informed that his ballot is valid and accepted by the machine, and he is not kept waiting anxiously while the machine completes the processing of the ballot.

The operation of relay 349 also shifts switch 890 to contact 892, thus connecting relay 650 to ground through switch 890 and a switch 894 of relay 376. Relay 650 is then actuated after a 60 millisecond pause caused by timing device 896.

Main stepping switch 292 is connected to ground through the following three parallel circuits: through switch 898 of relay 650; through switch 886 of relay and a switch 900 of relay 376; and through contacts 260 and 260' of bank 290 (FIGURE 6e) and switch 890 of relay 349. Therefore, after relay 349 is actuated at the end of the second cycle, main stepping switch 292 is held inoperable until relay 650 operates (60 milliseconds later), closing switch 898 and grounding switch 292. Switch 902 of relay 349 is connected on one side to ground through switch 904 of relay 650, and on the other side of office counter relay 838 and connector board 169 through switch 834 of relay 376. Consequently, during the time that main stepping switch 292 is inoperable, after the actuation of relay 349 and before that of relay 650, relays 838 and 840 (FIGURE 6a) are actuated, closing switches 842, 844, 846, 848, 850 and 852, applying voltage to all counters on the board selected by the circuit shown in FIGURE 6a.

Thus, all of the counters corresponding to individuals in offices from columns C1 through C6 and all counters corresponding to the positions in columns C8 through C11, who have received a vote independently of the party vote, are advanced.

When relay 650 operates at the end of the 60 millisecond delay, it disconnects relays 838 and 840 from ground by shifting switch 904, and reconnects main stepper 293 to ground through switch 898 and a switch 906 of relay 610, allowing switch 292 to step through its final cycle to deactivate all counters of offices having conflicting party and individual votes, as described previously. A switch 908 of relay 349 is connected to end cycle relay 610 and to contact 328' of bank 330 of switch 292, while contact 328 is connected to ground. Hence, when wiper 332 of bank 330 connects contacts 328 and 328' during the third cycle of switch 292, relay 610 is connected to ground through switch 908 and wiper 332 and is self-locked through a switch 910 of relay 610. The shifting of a switch 912 of relay 610 reconnects relay 838 with ground and allows the party vote, if any, to be recorded on the active counters. Switch 612 is shifted by relay 610 and initiates the reset action previously described.

A switch 914 of main stepping switch 292 is in the position shown in FIGURE 6f only when wiper 332 of bank 330 is connecting contacts 300 and 300', it being noted that the wipers of all banks act in unison, so that when wiper 332 connects contacts 300 and 300', wiper 294 of bank 290 connects contacts 260 and 260', wiper 552 of bank 550 connects contacts 520 and 520', wiper 422 of bank 420 connects contacts 390 and 390', and wiper 492 of bank 490 connects contacts 460 and 460'. Contacts 916 of switch 914 is connected to contact 260' of bank 290 of switch 292, and contact 260 of bank 290 is connected to contact 918 of switch 890 of relay 349. Contact 916 of switch 914 is also connected to switch 292. Therefore, when relay 610 is actuated, main stepping switch 292 is grounded through switches 906 and 914 and continues to operate until all wipers are in the home position, when switch 914 returns to the position shown in FIGURE 7. Furthermore, a grounded switch 920 of relay 376 is connected to switch 914, so that if relay 376 is actuated in a reject action while the wipers are off their home positions, switch 292 will remain grounded until the wipers return to their home positions.

Switch 922 of switch 292 is a self-interrupting switch which operates on each step to break the connection between switch 292 and operating buss 124. Switch 922 is connected to buss 124 through the following three parallel circuits: through switch 924 of relay 342 and switch 926 of relay 344; through a switch 928 of relay 656; and through switch 378 of relay 376. If a reject operates relay 376, main stepping switch 292 will continue to operate as previously described, receiving voltage from buss 124 through switch 378. If, however, no reject occurs to operate relay 376, after relay 349 operates at the end of the second cycle of switch 292, the switch is connected to operating buss 124 through switches 922, 924 and 926 alone. During the third cycle, either relay 342 or 344 may operate to disable the counters to an offices described previously. This disconnects main switch 292 until relay 656 operates to remove the back voltage to the counters and connect switch 292 with buss 124 through switch 928. When switch 292 is reconnected, it immediately operates again. Therefore, only the counters in the office having both a party vote and a conflicting office vote can be disabled by back voltage.

As seen in FIGURE 6a, relay 840 will operate to record the votes in columns C8, C9 and C10 at the same time that relay 838 operates. However, jumper 930 may be removed, and a means may be connected to the circuitry described herein to operate relay 840 at any desired time.

To use the present invention, all counters, located under the back panel 21 of cabinet 26, are set to zero. All other switches are under panel 22, with the exception of those in control box 46. After panel 22 is removed from cabinet 26, all multiposition switches SPCi–j are set according to whether the corresponding position on the ballot is to be used for a particular party vote (positions 3 through 12), a write-in vote (position 2), or a simple individual vote (position 1), as described previously. The connections between operating buss 124 and contacts 596, 598, 606 and 608 (FIGURE 6e) are then made in the desired manner, and switch 600 is set to either position 602 or 604. The group limits on columns C9 and C10 are then set on switches 586 and 588, and the offices in columns C1 through C6 are patched together on board 168 and to the appropriate jacks of patch panel 254. Finally, switch 820 (FIGURE 6a) is set to correspond to the type of election, and panel 22 is re-attached to cabinet 26. In the officials' control box 46, counter 52 is set to zero, and switches PS70 through PS79 are locked closed if the election is a secret primary (all of lamps L70 through L79 being either lighted or disconnected to maintain security).

After a voter receives his ballot from the election officials, he goes to a booth to punch it with a punch provided there. When he leaves the booth to approach the voting machine, the officials close the ready switch 48, and, in a closed "declared" primary, the switch corresponding to the voter's party. The voter, seeing the "READY" lamp lighted, inserts his ballot, which is processed as described previously. If the "VOTE COMPLETED" lamp lights after a wait of approximately two seconds, the voter may leave while the machine completes the voting by advancing the appropriate counters. If the "INVALID BALLOT" lamp 36 lights, a fraction of a second later he receiver his ballot from slot 28 and, depending on the laws of the state, may be permitted to vote with a fresh ballot. During a declared primary, the voter watches lamps 40, and, if the one corresponding to the party he declared is lighted, then his ballot is correct in that respect. However, if the party marked on his ballot and the switch presser by the officials from switches 50, i.e. switches PS70 through PS79, do not agree, he will see that there is a mistake which may then be immediately corrected. To change the one of switches so closed and make the ballot and lamp agree, the officials open switch 860, releasing solenoid 876 and allowing the party change necessary to make his control agree with the ballot held by the voter.

At the end of the election, the counters at the back of cabinet 26 are read and the ballots having a write-in vote and therefore placed in box 83 by the voting machine are removed and the write-in votes tallied. This completes the election, but all of the valid ballots have been retained for any later investigation.

In Connecticut, it is required that an audible signal device be operated whenever a straight party vote is cast on a machine. This law may be complied with by connecting a bell 940 to buss 124 and to line 249 through switch 888 of relay 114. Thus, when a straight party vote grounds line 249, bell 940 will ring at the same time "VOTE COMPLETED" lamp 32 is lighted.

In Alaska, a ballot is not rejected of two or more votes are cast in one office. In that state, all votes for that one office must be disregarded, but the remaining portion of the ballot is accepted. By disconnecting the leads to contacts 942 of switch 352 and 944 of switch 348 of relay 349, no office will generate a reject signal. The "erasure" of all votes for that office will be performed by the subsequent action of the disabling circuit, as described previously. If the existence of a straight party vote is required by law to invalidate any contradictory individual votes, but not to reject the entire ballot, the registering of the individual votes can be eliminated at the end of the second cycle by not connecting the lead to contact 946 of switch 904 of relay 650 and instead, shorting together contacts 948 and 950 of switch 904.

Various changes and modifications may be made without departing from the scope of the present invention.

I claim:

1. In a vote counting machine using a ballot: a ballot receptacle, a cover for said receptacle, a first solenoid having a plunger connected to said cover for operating said cover, a source of power, a power transmitting means connecting said first solenoid to said power source, a switch in said power transmitting means, said switch being operated by the ballot in said ballot receptacle and operating to disconnect said first solenoid from said power source, a holding means in said receptacle for holding the ballot in position for read-out, a ballot read-out means adjacent said position, a second solenoid for moving said read-out means and said holding means relative to one another preparatory to the read-out operation, a count-instigating means for performing the vote counting operation, said count-instigating means including a projection on said ballot holding means, a read-out switch situated on said read-out means and operated by said projection, a relay connected to said power source and actuated by said read-out switch, and a power buss actuated by said relay, said power buss carrying the operating power for said vote counting operation.

2. A vote counting machine as defined in claim 1 in which a ballot disposition means is included for directing and depositing the ballot after the vote has been cast, said ballot disposition means comprising a first ballot disposition means for receiving properly marked ballots not containing write-in votes, a second ballot disposition means for receiving ballots containing write-in votes, and a third ballot disposition means for handling improperly marked ballots.

3. In a vote counting machine using a ballot: a ballot receiving means, a ballot holdng means for holding the ballot in position for read-out, a ballot read-out means, and a ballot disposition means for directing and depositing the ballot after the vote has been read, said ballot disposition means including a first ballot disposition means for receiving properly marked ballots not containing write-in votes, a second ballot dispositon means for receiving ballots containing write-in votes, and a third ballot disposition means for handling improperly marked ballots, said first ballot disposition means comprising a disengage relay actuated at the termination of the vote counting operation, a disengage solenoid controlled by said disengage relay, the plunger of said disengage solenoid connected to said ballot holding means and operating in response to said disengage relay to disengage said ballot from said ballot read-out means, a drop solenoid actuated by said disengage relay, the plunger of said drop solenoid being connected to a drop means, moving said drop means, moving said drop means in response to said disengage relay to pass the ballot into a disposition chute and therefrom into a collection chamber for properly marked ballots not containing write-in votes, said second ballot disposition means comprising a write-in relay energized in response to a write-in vote cast on the ballot, said write-in relay actuating said disengage solenoid and said drop solenoid causing the ballot to enter said disposition chute, a write-in solenoid connected to said write-in relay, and a write-in channeling means for directing the ballot into a station for properly marked ballots containing write-in votes, the plunger of said write-in solenoid being connected to said write-in channelling means for operating said channelling means, said third ballot disposition means comprising an invalid-ballot power buss energized in response to an improperly marked ballot, an actuating means connecting said invalid-ballot power buss to said disengage relay, energization of said invalid-ballot power buss actuating said disengage solenoid and said drop solenoid causing the ballot to enter said disposition chute, an unlock relay connected to said invalid-ballot power buss, and an invalid-ballot solenoid controlled by said unlock relay connected to an invalid-ballot channelling means, said invalid-ballot channelling means directing the ballot into a rejected ballot chute.

References Cited

UNITED STATES PATENTS

| | | | |
|---|---|---|---|
| 2,750,108 | 6/1956 | Keith | 235—56 |
| 2,940,663 | 6/1960 | Fechter et al. | |
| 3,178,107 | 4/1965 | Fagan | 235—56 |

MAYNARD R. WILBUR, Primary Examiner

THOMAS J. SLOYAN, Assistant Examiner

U.S. Cl. X.R.

235—56